(12) United States Patent  (10) Patent No.: US 7,152,783 B2
Charrin  (45) Date of Patent: Dec. 26, 2006

(54) COMBINED CARD READER AND BILL ACCEPTOR

(75) Inventor: Philippe A. Charrin, Los Angeles, CA (US)

(73) Assignee: Smart Card Integrators, Inc., Los Angeles, CA (US)

( * ) Notice: Subject to any disclaimer, the term of this patent is extended or adjusted under 35 U.S.C. 154(b) by 769 days.

(21) Appl. No.: 09/903,322

(22) Filed: Jul. 10, 2001

(65) Prior Publication Data

US 2003/0014370 A1   Jan. 16, 2003

(51) Int. Cl.
G07F 19/00 (2006.01)
G06K 7/00 (2006.01)

(52) U.S. Cl. .................. 235/379; 235/440; 235/439; 902/40

(58) Field of Classification Search ............... 235/375, 235/435, 379–381, 439, 440, 449, 451; 705/39, 705/41; 463/16–21, 25; 902/8, 22, 30–32, 902/39, 40
See application file for complete search history.

(56) References Cited

U.S. PATENT DOCUMENTS

| | | | |
|---|---|---|---|
| 4,808,803 A | * | 2/1989 | Magier et al. .............. 235/382 |
| 5,038,022 A | | 8/1991 | Lucero ....................... 235/380 |
| 5,450,938 A | * | 9/1995 | Rademacher ............... 194/206 |
| 5,495,098 A | * | 2/1996 | Pailles et al. ............... 235/492 |
| 5,630,755 A | | 5/1997 | Walsh et al. ................. 463/25 |
| 5,635,696 A | * | 6/1997 | Dabrowski .................. 235/449 |
| 5,919,091 A | * | 7/1999 | Bell et al. ..................... 463/25 |
| 5,955,718 A | | 9/1999 | Levasseur et al. .......... 235/381 |
| 6,296,182 B1 | * | 10/2001 | Ota et al. ................... 235/379 |
| 6,577,733 B1 | * | 6/2003 | Charrin ...................... 380/251 |

* cited by examiner

Primary Examiner—Karl D. Frech
Assistant Examiner—Jamara A. Franklin
(74) Attorney, Agent, or Firm—Irell & Manella LLP

(57) ABSTRACT

A combined bill acceptor and smart card reader (or other data unit reader) comprises a bill acceptor, a host interface, and a smart card reader interposed between the bill acceptor and the host interface. The smart card reader preferably permits unimpeded pass-through of cash transaction data from the bill acceptor to the host interface when currency is accepted by the bill acceptor, and transmits cashless transaction data to the host interface when a smart card is read by the card reader. The smart card reader may route the cash transaction data using a hardware connection, such as a relay, or a soft connection, such as by serial interface devices in communication with the bill acceptor and the host device. The smart card reader may provide secure storage of transaction history data, as well as advanced authentication and verification functions. The combined bill acceptor and card reader may interface with a central computer, either directly or indirectly, allowing multiple on-line machines to be connected in a network configuration.

45 Claims, 15 Drawing Sheets

COMBINED CARD READER AND BILL ACCEPTOR

BACKGROUND OF THE INVENTION

1) Field of the Invention

The field of the present invention relates to systems and methods for combining a bill acceptor and a card reader in the same machine, such as an electronic gaming machine.

2) Background

Bill validators have been used for many years in connection with various types of vending machines, electronic gaming machines, and other automated machines used by consumers at large. A main function of a bill validator is to provide a mechanism for consumers to purchase goods or services from an automated machine, by providing a conspicuous location for consumers to input currency, confirming that the currency is authentic, crediting the consumer if the currency is authentic, returning the currency if the currency is not authentic, and placing the currency in a secure compartment for later retrieval by maintenance or operational personnel. Addition of a bill validator to an automated machine eliminates the need for human intervention in handling the currency, therefore reducing the cost of providing the goods or services associated with the machine and decreasing the risk of human error or fraud in currency transactions. It also increases the convenience to consumers, who need not carry around or attempt to deposit large numbers of coins in the machine. Since bills are usually significantly higher in denomination than coins, only a single bill deposit may be needed for a transaction, whereas many coins may be needed for the same transaction.

Although bill validators have proven useful and convenient in many contexts, they are by their very nature unable to provide for non-cash transactions. The advent of cashless systems has given consumers an alternative to using currency for all automated transactions. Credit cards and debit cards are examples of cashless devices. However, credit cards and debit cards typically require a relationship with a financial institution that issues such cards. Usually, a fee is charged to the merchant against a credit card transaction by a credit card transaction processing agency, reducing profitability to merchants. Further, integrating credit card or debit card functionality at a merchant site may require expensive or complex electronic circuitry. Each credit or debit transaction generally necessitates involvement by an outside agency to approve the transaction electronically in real-time, requiring communication with a remote credit or debit approval site, making credit or debit transactions inconvenient for use in off-line machines, particularly off-line electronic gaming machines. For these reasons, among others, cashless transactions using credit cards or debit cards have only been utilized in limited contexts.

Alternatively, portable data carriers commonly known as a "smart cards" have also been developed and used in a variety of industries. A smart card is a device generally the size and shape of a standard credit card, encapsulating solid-state memory, circuitry for allowing the memory to be read from or written to, and, in certain configurations, microprocessor circuitry for performing various programmable functions. Smart cards may be equipped with an interface having electrical contacts which make a physical connection with a smart card reader, or else may be equipped with a radio frequency (RF) interface to allow a smart card reader to interact with the smart card circuitry over an RF communication link. A standard (ISO) protocol has been developed within the smart card industry for communicating between smart cards and smart card readers.

If properly programmed, smart cards can be used various types of cashless transactions. Typically, credits are written on to the smart card at a centralized cashier location, and credits are removed from the smart card when inserted into a smart card reader designed to utilize the particular cashless protocol. Use of smart cards has the advantage of not requiring the intervention of a credit or debit transaction processing agency for each cashless transaction.

While smart cards allow increased convenience to consumers engaging in cashless transactions with automated, electronic machines, only a small percentage of consumers presently use smart cards, particularly in the United States, primarily due to the fact that very little infrastructure in this country has been built up to support smart cards. Accordingly, it would be advantageous to provide automated, electronic machines which allow either cash or cashless transactions to occur, so that consumers have a choice between using currency (by depositing cash into a bill validator, for example) or else using a portable cashless data unit, such as a smart card.

Some attempts have been made to combine bill validator functionality with cashless transaction processing functionality, but such attempts have been limited thus far. This may be because current bill validator protocols are quite different in nature than cashless transaction protocols. For example, bill validator protocols provide very limited functionality. Indeed, virtually all bill validator protocols are unidirectional—that is, from the bill validator to the host machine. With a bill validator protocol, particularly in the context of electronic gaming machines, there is no need to send credit from the host machine to the bill validator, hence there is no need for a bidirectional protocol. However, a unidirectional protocol is not very suitable for cashless transactions, as often it may be desirable to send credit from the host machine to the cashless data reader, so that winnings can be credited to the cashless data unit (e.g., smart card).

However, a significant security risk is posed by permitting credit to be transferred from a host machine to a cashless data reader. Without adequate precautionary measures, a substantial risk of fraud exists by, for example, electronic manipulation of the cashless data reader interface. This risk of fraud is not limited to gaming customers, but also exists (perhaps more so) with respect to internal casino personnel, who often are provided with ready access to the electronic gaming machines.

One attempt to provide both bill validation and card reader functionality in a single machine (in particular, a vending machine) is described in U.S. Pat. No. 5,955,718 to Levasseur et al. The device described in that patent includes an integrated module having a bill examination portion, a card examination portion, an interface portion, a display portion, and a data entry portion, each of which is connected to a processor portion. The interface portion includes a multi drop bus interface, an L logic interface, and a bill validator interface, so that the integrated module may be connected to a multi drop bus, an L logic connector, or a bill validator connector of a particular vending machine. The multi drop bus interface is a universal vending machine interface, further details of which are set forth in the National Automatic Merchandising Association International Multi-Drop Bus Interface Standard as promulgated by the NAMA Vending Technology Standards Committee.

While the device described in the aforementioned patent has the advantage of combining functionality of a bill validator and card reader, its integrated nature makes it difficult to retrofit existing machines or conform to existing bill validator hardware. Rather, it generally requires replacement of the entire bill validator hardware. Further, it is directed to a vending machine application utilizing a multi drop bus, and therefore is not necessarily applicable other types of machines that could benefit from combined bill validator and card reader functionality. In addition, the patent does not describe techniques for combined bill validator and card reader functionality in the context of multiple on-line machines, such as may be connected to a central computer or processing station in a network configuration.

In addition, a combined bill validator and card reader made for vending machines will generally not be suitable for use with electronic gaming machines. For example, electronic gaming machines usually do not have a multi drop bus, and vending machines do not use protocols which are standard in the gaming industry. Further, vending machines do not provide the capability of transmitting credit from the host machine to the portable cashless data unit. Moreover, a combined bill validator and card reader made for vending machines is unlikely to provide the kind of security needed for sending credit to the portable cashless data unit, in a transaction similar to a "cash out," for example.

Therefore, a need exists for a combined bill acceptor and smart card (or other data unit) reader, which is capable of allowing either cash transactions or cashless transactions. A need further exists for such a combined bill acceptor and smart card reader which provides increased security against possible fraud or theft, and which is easy to integrate with existing bill acceptor technologies. A need also exists for a combined bill acceptor and smart card reader which is well suited for use with electronic gaming machines, and particularly with multiple on-line electronic gaming machines controlled by a central computer or network.

SUMMARY OF THE INVENTION

The invention in one aspect provides a combined bill acceptor and card reader having one mode in which cash transactions are processed (e.g., cash is accepted) and another mode in which cashless transactions are processed.

In one embodiment, a combined bill acceptor and card reader unit (or other data reader unit) comprises a bill acceptor, a host interface, and a card reader interposed between the bill acceptor and the host interface. The card reader preferably permits unimpeded pass-through of cash transaction data from the bill acceptor to the host interface when currency is accepted by the bill acceptor, and transmits cashless transaction data to the host interface when a card is read by the card reader.

In another aspect, a multi-mode card reader comprises a card reader interface (or other data unit interface), a bill acceptor interface, a host interface, and a controller connected to each of the card reader interface, bill acceptor interface, and host interface. The controller preferably allows transfer of bill validation data from the bill acceptor interface to the host interface when bill validation data is received from the bill acceptor interface, and allows transfer of cashless transaction data from the card reader interface to the host interface when the cashless transaction data is received from the card reader interface.

In a particular embodiment, a combined bill acceptor and card reader interfaces with a central computer, either directly or indirectly, allowing multiple on-line machines to be connected in a network configuration.

Further embodiments, variations and enhancements are also disclosed herein.

DETAILED DESCRIPTION OF PREFERRED EMBODIMENTS

Figure 1:
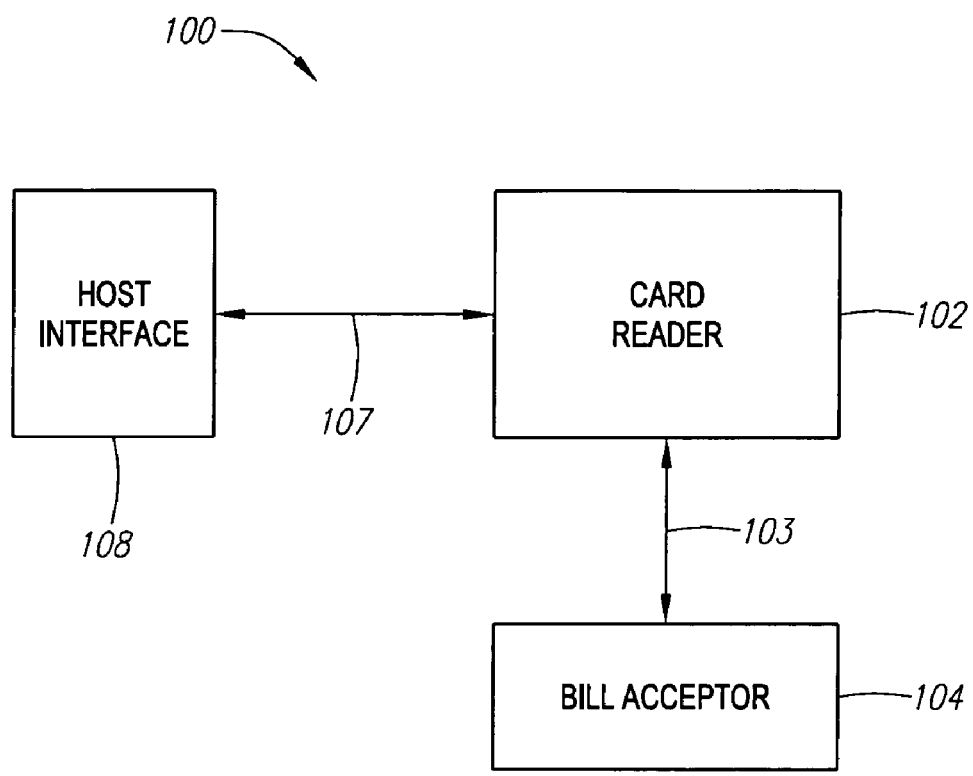
FIG. 1 is a top-level diagram of a combined bill acceptor and card reader unit in accordance with one embodiment as described herein.

FIG. 1 is a top-level diagram of a combined bill acceptor and card reader system 100 in accordance with one embodiment as described herein. As illustrated in FIG. 1, the combined bill acceptor and card reader system 100 comprises a bill acceptor 104, a host interface 108, and a card reader 102 interposed between the bill acceptor 104 and the host interface 108. The bill acceptor 104 preferably communicates with the card reader 102 using a standard protocol such as bill validator (B.V.) protocol, which is a well known protocol used in connection with bill acceptors. Similarly, the card reader 102 preferably communicates with the host interface 108 using the B.V. bill validator protocol. In a preferred embodiment, the card reader 102 permits essentially unimpeded pass-through of cash transaction data from the bill acceptor 104 to the host interface 108 when currency is accepted by the bill acceptor 108, and transmits cashless transaction data to the host interface 108 when a card is read by the card reader 102.

The card reader 102 may be configured to read any of a wide variety of cards or other portable data units. For example, the card reader 102 may be configured to read smart cards, magnetic stripe cards, credit cards, debit cards, or other types of cards or portable data units. The bill acceptor 104 may be of any conventional design, and generally has the function of accepting currency (typically paper currency), validating that the currency is authentic, and relaying information about the amount of currency accepted over the connection 103 to the card reader 102.

In the absence of the card reader 102, the bill acceptor 104 would typically be configured so as to communicate directly with the host interface 108 of the machine (e.g., a vending machine, gaming machine, or other type of machine) using a standard protocol such as the B.V. bill validator protocol. In the embodiment illustrated in FIG. 1, however, the card reader 102 preferably provides, beyond the bill validation functionality, the additional functionality of card reading, while at the same time minimizing the chance for conflicts between a situation in which both currency and a card is entered by the consumer. To this end, the card reader 102 determines whether the combined bill acceptor and card reader system 100 should operate in a cash (i.e., bill validation) mode, or else in a cashless (i.e., card reading) mode. In a preferred embodiment, the card reader 102 prevents the bill acceptor 104 from accepting currency when a card or other appropriate portable data unit is being read or processed by the card reader 102. Conversely, once currency has been accepted by the bill acceptor 104 and that information relayed to the card reader 102, the card reader 102 preferably does not permit a card or other appropriate portable data unit to be read until the cash transaction is completed.

Figure 2:
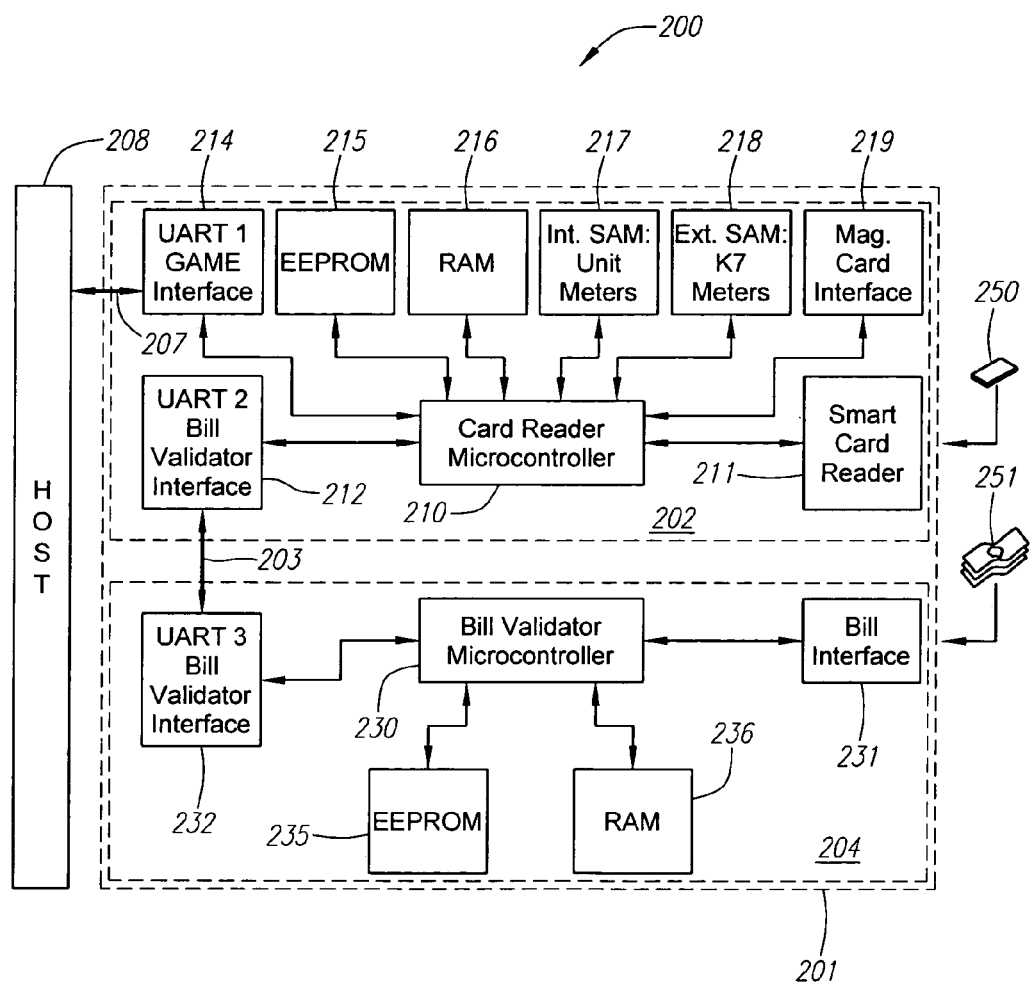
FIG. 2 is a more detailed diagram of a combined bill acceptor and card reader unit.

FIG. 2 is a more detailed diagram of a combined bill acceptor and card reader system 200 in accordance with a particular embodiment as described herein. As illustrated in FIG. 2, the combined bill acceptor and card reader system 200 comprises a combined bill acceptor and card reader unit 201 having a bill acceptor 204 connected to a card reader 202 across a connection 203. In this particular embodiment, the card reader 202 comprises a microcontroller 210 which controls the general operation of the card reader 202. The microcontroller 210 is preferably connected to a host interface device 214, a bill acceptor interface 212, a card interface 211, a non-volatile memory 215, a random access memory (RAM) 216, an optional magnetic card interface 219, an internal security and authentication module (SAM) 217, and an optional external security and authentication module (SAM) 218. The microcontroller 210 may comprise any circuitry for managing the logic and other operations of the card reader 202, including any suitable processor (or set of processors), firmware or hardwired circuitry. The non-volatile memory 215 stores program code and non-volatile data for the card reader 202, and may comprise read-only memory (ROM), programmable ROM (PROM), erasable PROM (EPROM), electrically erasable PROM (EEPROM), or any other type of suitable non-volatile memory.

The card reader 202, through the host interface device 214, connects to a host device 208 over a host connection 207. The host device 208 may be any machine or device for which it would be convenient or useful to provide a monetary or financial transaction, either using cash or a non-cash means. For example, the host device 208 may comprise an electronic gaming machine (EGM), a vending machine, a change machine, or any other machine or device which may require monetary value to initiate or carry out its function. The combined bill acceptor and card reader system 200 may be particularly advantageous where the host device 208 comprises an electronic gaming machine, because of, among other things, the capability provided in certain embodiments of permitting credit to be returned from the host device 208 to the card reader 202 in a secure manner.

In the particular embodiment illustrated in FIG. 2, the bill acceptor 204 comprises a microcontroller 230, a currency interface 231, a non-volatile memory 235, a random-access memory 236, and a bill acceptor interface device 232. Similar to the card reader microcontroller 210, the bill acceptor microcontroller 230 may comprise any suitable circuitry for managing the logic and other operations of the bill acceptor 204, including any suitable processor (or set of processors), firmware or hardwired circuitry. The non-volatile memory 235 stores program code and non-volatile data for the bill acceptor 204, and may comprise ROM, PROM, EPROM or EEPROM, to name a few examples, or any other suitable non-volatile memory.

In a preferred embodiment, the card reader 202 provides functionality to read both smart cards (or other similar portable data units) and magnetic strip cards. This functionality is depicted in FIG. 2 with functional blocks identified as card interface 211 and magnetic card interface 219. In one embodiment, the functionality of card interface 211 and magnetic card interface 219 is combined into a single physical unit capable of reading either smart cards or magnetic strip cards. Examples of suitable devices having such capability are conventionally available, and include, e.g., products available commercially under model designations SCI3000-M and SCI4000-M, manufactured by Smartcard Integrators, Inc. of Los Angeles, Calif. Generally, such devices provide a single slot for insertion of either a smart card or a magnetic strip card, and include a magnetic strip electrical interface along the side of the slot where the magnetic strip would be when the card was inserted, in addition to electrical contacts or an RF interface for interfacing with a smart card when inserted into the slot. However, in other embodiments, the card interface 211 and magnetic card interface 219 may be physically constructed as separate and independent units; in yet other embodiments, a magnetic card interface 219 is not provided.

It is preferred that a portable data device in the form of a card 250, and more specifically a smart card, be utilized, because of a number of advantages provided thereby. A smart card, as previously noted, is a device generally in the size and shape of a standard credit card, encapsulating solid-state memory, circuitry for allowing the memory to be read from or written to, and, preferably, microprocessor circuitry for performing various programmable functions. Smart cards may be equipped with an interface having electrical contacts which make a physical connection with a smart card reader, or else, alternatively, may be equipped with a radio frequency (RF) interface to allow a smart card reader to interact with the smart card electronic circuitry over an RF communication link. Use of a smart card as a portable data device is preferred because of the ability, with on-board microprocessor circuitry, to imbue the smart card with intelligence, thereby facilitating various security and other features described herein. Alternative portable data devices used instead of smart cards preferably have built-in intelligence in the form of programmable microprocessor circuitry or the equivalent, to carry out the security and other features described elsewhere herein.

The host interface device 214 and bill acceptor interface devices 212, 214 may comprise any type of data interface, either serial or parallel in nature, as may be found convenient. In various embodiments, the host interface device 214 and bill acceptor interface devices 212, 214 each comprise a serial interface and, more particularly, a universal asynchronous receiver/transmitter (UART) interface, which is a well known interface in the art of computers and digital circuit design. However, any or all of the host interface device 214 and bill acceptor interface devices 212, 214 may comprise any other type of interface, such as, for example, a universal serial bus (USB) interface.

Figure 10:
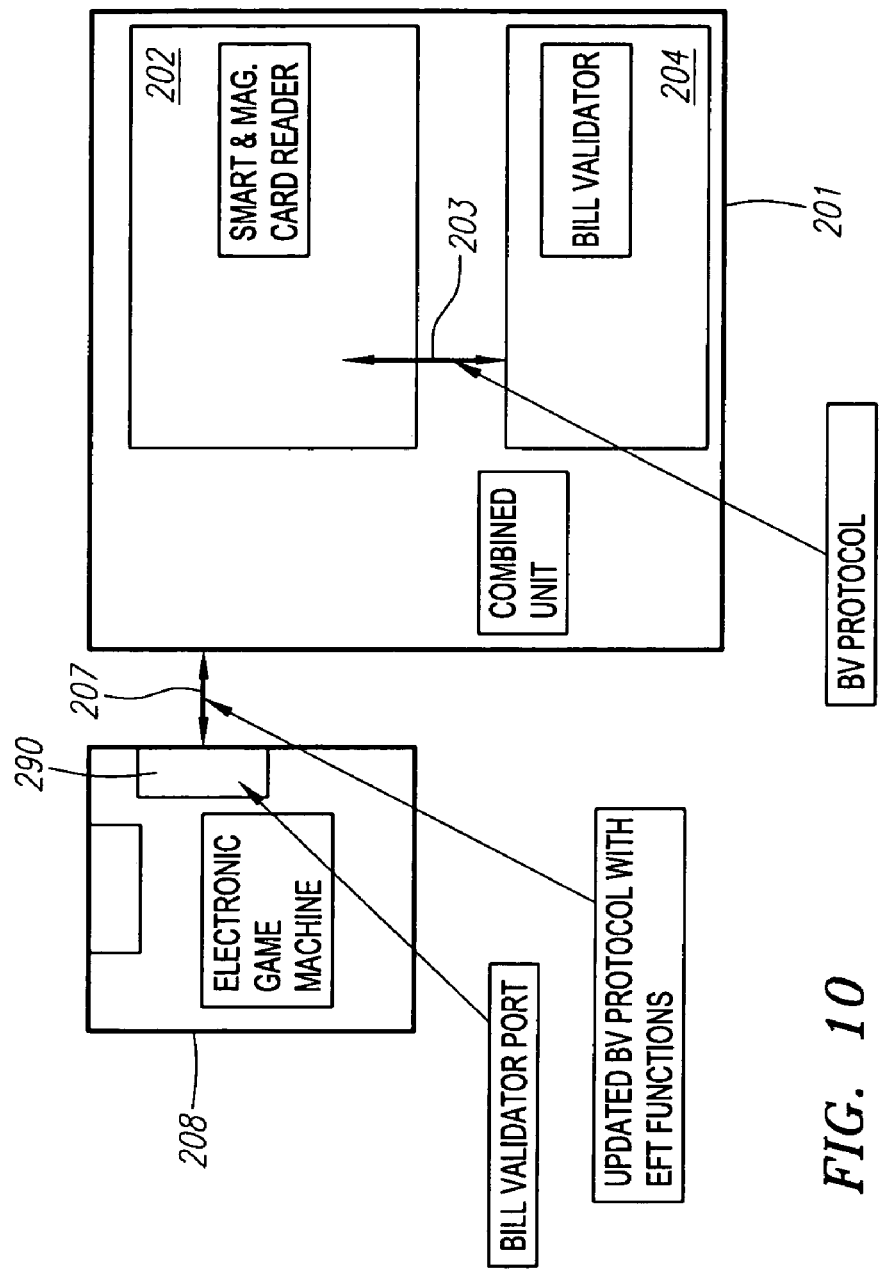
FIG. 10 is a conceptual block diagram illustrating operation of a combined bill acceptor and card reader such as that depicted in FIG. 2, in an off-line situation.

FIG. 10 is a conceptual diagram illustrating operation of the combined bill acceptor and card reader 200 of FIG. 2, in an off-line situation. As illustrated in FIG. 10, the host device 208 may comprise a host interface device 290 (such as a UART) for communicating across the host interface 207. The host interface 207 preferably supports both bill validation and electronic fund transfer (EFT) protocol functions. Also shown in FIG. 10 is a B.V. bill validator interface 203 between the bill acceptor 204 and card reader 202.

Figure 3:
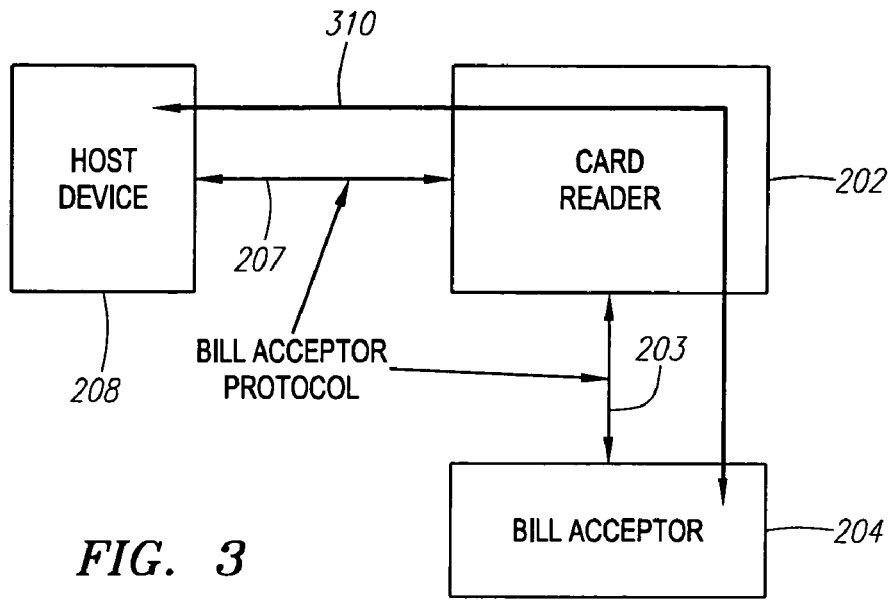
FIG. 3 is a conceptual diagram illustrating an example of operation of a combined bill acceptor and card reader unit operating in a cash mode.

In a preferred embodiment, the combined bill acceptor and card reader unit 201 has multiple operational modes, including at least a "cash" mode and a "cashless" mode. FIG. 3 is a conceptual diagram illustrating an example of operation of a combined bill acceptor and card reader unit operating in a first (i.e., "cash") mode. As illustrated in FIG. 3, when in a cash mode, the bill acceptor 204 communicates with the card reader 202 over a first B.V. bill validator interface 203, and the card reader 202 communicates with the host device 208 over a second B.V. bill validator interface 207. In a preferred embodiment, the card reader 202 effectively provides a pass-through connection from the bill acceptor 204 to the host device 208 when the combined bill acceptor and card reader unit 201 is operating in the cash mode. In FIG. 3, this operation is illustrated conceptually by communication path 310 shown between the bill acceptor 204 and host device 208, passing through card reader 202.

Figure 4:
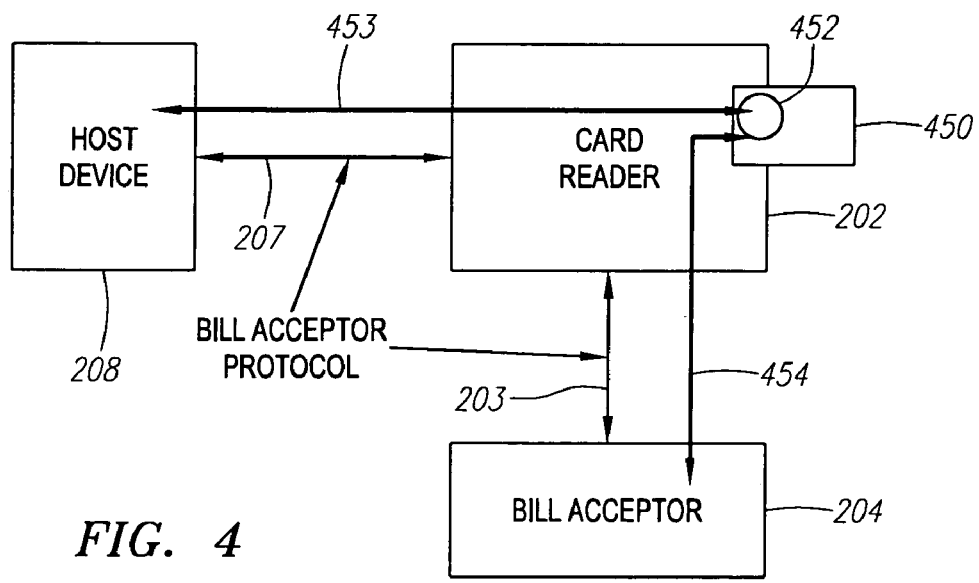
FIG. 4 is a conceptual diagram illustrating an example of operation of a combined bill acceptor and card reader unit operating in a cashless mode.

FIG. 4 is a conceptual diagram illustrating an example of operation of a combined bill acceptor and card reader unit operating in a second (i.e., "cashless") mode. As illustrated in FIG. 4, when in a cashless mode, and similar to FIG. 3, the bill acceptor 204 communicates with the card reader 202 over a first B.V. bill validator interface 203, and the card reader 202 communicates with the host device 208 over a second B.V. bill validator interface 207. In a preferred embodiment, the card reader 202 also communicates with the host device 208 using a two-way protocol preferably having electronic fund transfer (EFT) functionality. The card reader 202 preferably reads information from a card (e.g., smart card) 450 presented to it, via the card interface circuitry 452 located on the card 450. The card reader 202 interacts with the host device 208 to electronically transfer monetary value between the card 450 and the host device 208. The card reader 202 also oversees transfer of monetary value from the bill acceptor 204 to the card 450, when the user inserts currency into the bill acceptor 204. These collective operations are illustrated conceptually by communication path 454 shown between the bill acceptor 204 and card reader 202, and communication path 453 between the card reader 202 and the host device 208.

The operational modes depicted in FIGS. 3 and 4 may be further described by way of specific example in the context of the more detailed combined bill acceptor and card reader system 200 of FIG. 2, although the concepts illustrated in FIGS. 3 and 4 may be applied with respect to a variety of other embodiments of combined bill acceptor and data unit readers as well. First, when operating in "cash mode" (as conceptualized in FIG. 3), the bill acceptor 204 communicates with the card reader 202 over the B.V. bill validator interface 203 and, more specifically, according a preferred embodiment, across a serial interface comprised of complementary bill acceptor interface devices 212, 232 which may be embodied as, e.g., universal asynchronous receiver/transmitters (UARTs). Similarly, the card reader 202 communicates with the host device 208 over another B.V. bill validator interface 207 and, more specifically, according to a preferred embodiment, across a serial interface comprised of complementary host interface devices, one of which is host interface device 214 which may be embodied as, e.g., a UART. The card reader 202 effectively provides a pass-through connection from the bill acceptor 204 to the host device 208 when the combined bill acceptor and card reader unit 201 is operating in the cash mode. Accordingly, when currency is accepted by the bill interface 231, the bill validator microcontroller transmits messages in B.V. bill validator protocol across the bill acceptor interface 203. Bill acceptor interface device 212 notifies the microcontroller 210 in the card reader 202 that cash transaction data is being transmitted by the bill acceptor 204. In response, the microcontroller 210 in the card reader 202 controls the transfer of the cash transaction data to the host interface device 214, which passes the cash transaction data to the host device 208.

To facilitate this transfer of data, the cash transaction data may be temporarily stored in a buffer or random-access memory (RAM, such as, e.g., RAM 216) in the card reader 202. Alternatively, each bit or item of data received from the bill acceptor 204 may immediately be transferred to the host device interface 214 for transmission to the host device 208, without any storage in the card reader 202. In this latter embodiment, if desired, the bill acceptor interface device 212 in the card reader 202 may prevent further transfer of data from the bill acceptor 214 until the current data bit or item is transferred to the host device 208, freeing the host interface device 214 for accepting further cash transaction data.

When the combined bill acceptor and card reader 201 is operating in the second (i.e., "cashless") mode, the bill acceptor 204 communicates with the card reader 202 over the B.V. bill validator interface 203, and, more specifically, according a preferred embodiment, across a serial interface comprised of complementary bill acceptor interface devices 212, 232 which, as previously noted, may be embodied as, e.g., universal asynchronous receiver/transmitters (UARTs). Similarly, the card reader 202 communicates with the host device 208 over the second B.V. bill validator interface 207 and, more specifically, according to a preferred embodiment, across a serial interface comprised of complementary host interface devices, one of which is host interface device 214 which, as previously noted, may be embodied as, e.g., a UART. In a preferred embodiment, the card reader 202 also communicates with the host device 208 using a two-way protocol preferably having electronic fund transfer (EFT) functionality. The card reader 202 preferably reads information from a card (e.g., smart card) 250 presented to the smart card interface 211, which communicates across the card interface circuitry (depicted graphically in FIG. 4 as card interface circuitry 452) located on the card 250. Under direction of the microcontroller 210 of the card reader 202, the cashless transaction data is transferred to the host interface device 214 and thereby passed along to the host device 208. The card reader 202 thus allows electronic transfer of value (e.g., credit) from the card 250 to the host device 208. Conversely, the card reader 202 also allows transmission of cashless transaction data from the host device 208 to the card 250 via the smart card interface 211, under the direction of the microcontroller 210 in the card reader 202.

To facilitate the transfer of data between the card 250 and the host device 208, the cashless transaction data may be temporarily stored in a buffer or random-access memory (RAM, such as, e.g., RAM 216) in the card reader 202. Alternatively, each bit or item of data received at the smart card interface 211 may immediately be transferred to the host interface device 214 for transmission to the host device 208, without any storage in the card reader 202, and each bit or item of data received at the host interface device 214 may immediately be transferred to the smart card interface 211 for transmission to the card 250, without any storage in the card reader 202. In this latter embodiment, if desired, the host interface device 214 in the card reader 202 may prevent further transfer of data from the smart card interface 211 until the current data bit or item is transferred to the host device 208, freeing the host interface device 214 for accepting further cashless transaction data. Similarly, if desired, the smart card interface 211 in the card reader 202 may prevent further transfer of data from the host device interface 214 until the current data bit or item is transferred to the card 250, freeing the smart card interface 211 for accepting further cashless transaction data from the host device 208.

If a magnetic card interface 219 is included, transfer of cashless transaction data between a magnetic card (not shown) and the host device 208 proceeds in a similar manner through the card reader 202.

Figure 5:
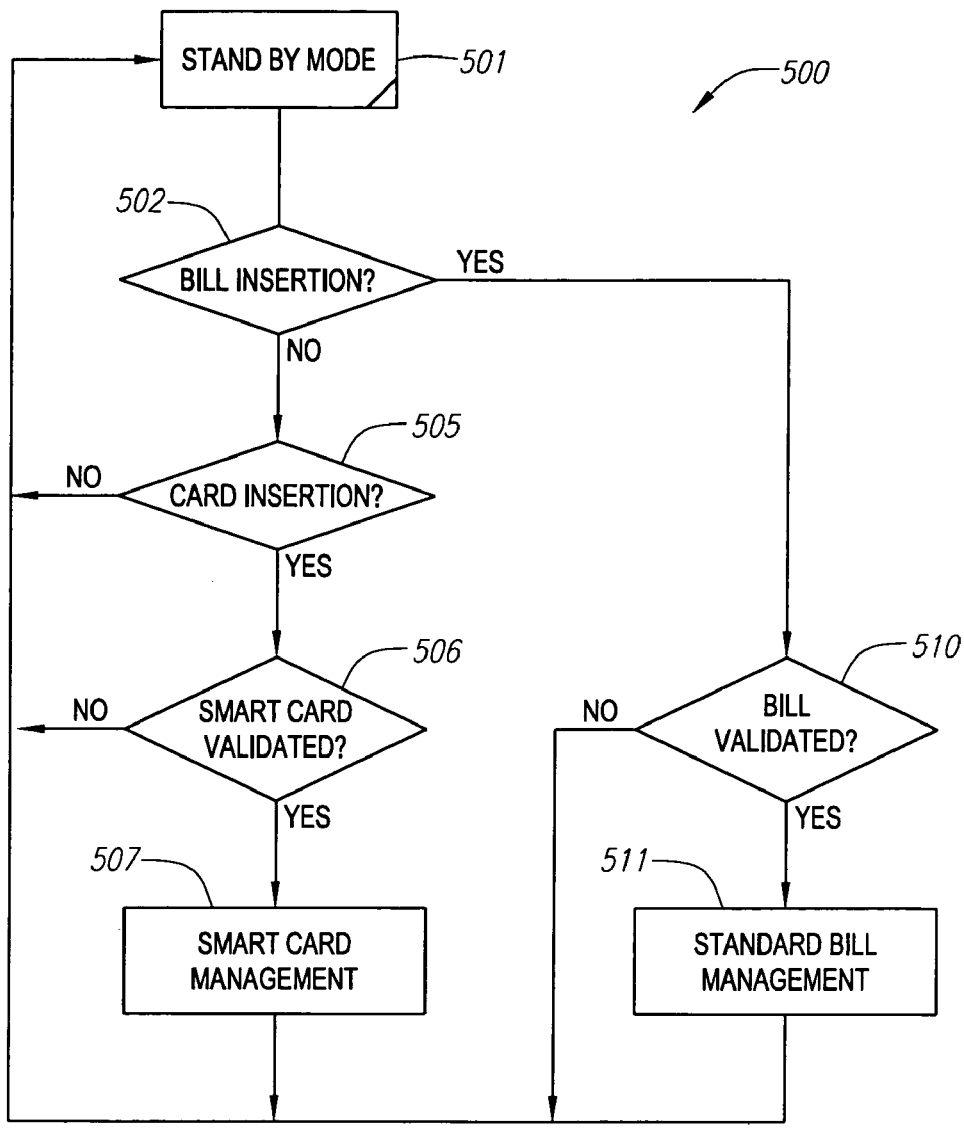
FIG. 5 is a flow diagram illustrating one example of selectively entering either a card management mode or a bill management mode.
Figure 6:
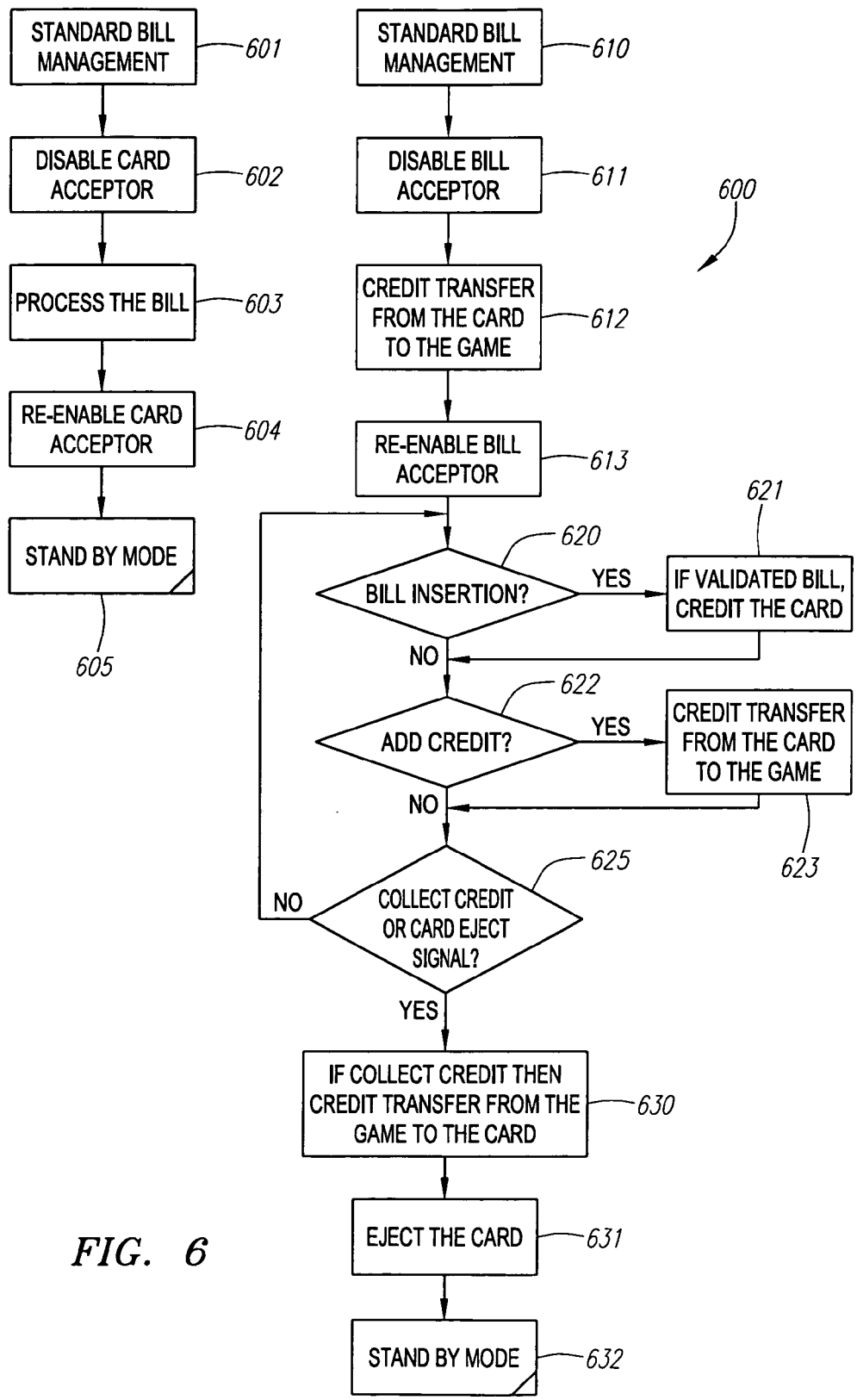
FIG. 6 is a flow diagram illustrating examples of processing carried out in connection with card management and bill management.

FIGS. 5 and 6 are flow diagrams illustrating mode selection in a preferred combined bill acceptor and card reader system. While the principles illustrated in FIGS. 5 and 6 are applicable to a wide variety of embodiments, it is convenient to explain their steps in the context of the combined bill acceptor and card reader 201 depicted in FIG. 2. FIG. 5, in particular, is a flow diagram illustrating one example of selectively entering either a card management mode or a bill management mode. As illustrated in FIG. 5, the combined bill acceptor and card reader 201 (after power-up and initialization) enters a stand-by mode in step 501. In a preferred embodiment, the microcontroller 210 in the card reader 202 provides the mode selection logic, and mode changes at the top level are carried out according to logic programmed in the card reader 202. When in stand-by mode, the combined bill acceptor and card reader 201 awaits presentation of either a bill (or other currency) or a card (or other portable cashless data unit). If a bill is inserted in the bill interface 231, as indicated by steps 502 and 510 in FIG. 5, then the bill validator 204 attempts to validate the bill, according to any of a variety of techniques well known in the art of bill validation. If the bill is validated, then, as indicated by step 511, the bill validator 204 attempts to send cash transaction data via the B.V. bill validator interface 203, and, in response, the combined bill acceptor and card reader 201 enters a cash mode and conducts a bill management process, further details of which are illustrated in FIG. 6.

If, on the other hand, a card is inserted in the smart card interface 211, as indicated by steps 505 and 506 in FIG. 6, then the card reader 202 attempts to validate the card 250. If the card is validated, then, as indicated by step 507, the combined bill acceptor and card reader 201 enters a cashless mode and conducts a smart card management process, further details of which are illustrated in FIG. 6.

FIG. 6 is a flow diagram illustrating examples of processing carried out in connection with card management, when in a cashless mode, and bill management, when in a cash mode. As illustrated in FIG. 6, when in a cash mode, the smart card reader 211 is first disabled by the microcontroller 210 of the card reader 202, as indicated by step 602 in FIG. 6, so as to prevent reading cashless transaction data simultaneously with cash transaction data should a card 250 thereafter be presented to the smart card reader 211. Next, in step 603, the cash transaction data from the currency is processed. For example, the cash transaction data is received at the card reader 202 across the B.V. bill validator interface 203, and passed along to the host device 208 across the host connection 207. After the cash transaction data is transferred across the host connection 207, the smart card reader 211 is re-enabled by the microcontroller 210 of the card reader 202, as indicated by step 604. After re-enabling the smart card reader 211, the card reader 202 returns to the stand-by mode, as indicated by step 605. When in the stand-by mode, the combined bill acceptor and card reader 201 continues to await presentation of either currency or a cashless data unit, such as a smart card. The insertion of a card 250 may occur at this point, even if the player has not yet exhausted any credit at the host device 208 which was generated as a result of the deposit of currency and transfer of cash transaction data to the host device 208.

When in a cashless mode, on the other hand, the bill acceptor 204 is disabled by the card reader 202, as indicated by step 611 in FIG. 6, so as to prevent an attempt to simultaneously process cash transaction data and cashless transaction data should currency thereafter be presented to the bill acceptor 204. Within the B.V. bill validator protocol, a command exists to disable a bill validation device, and such a command may be transmitted by the microcontroller 210 of the card reader 202 across the B.V. bill validator interface 203 to indefinitely disable the bill acceptor 204. In a next step 612, credit is transferred from the card 250 to the host device 208 using a cashless transaction protocol. Techniques for transferring credit to a host device 208 (such as an electronic gaming machine) are described in detail in copending U.S. patent application Ser. No. 09/456,021 filed on Dec. 3, 1999, entitled "Method and System for Secure Cashless Gaming," which application is assigned to the assignee of the present invention, and hereby incorporated by reference as if set forth fully herein. In a next step 613, after the aforementioned processing of cashless transaction data, the bill acceptor 204 is re-enabled by the card reader 202. Within the B.V. bill validator protocol, a command exists to enable a bill validation device, and such a command may be transmitted by the microcontroller 210 of the card reader 202 across the B.V. bill validator interface 203 to re-enable the bill acceptor 204.

Once the bill acceptor is re-enabled 204, currency may be presented to and processed by the combined bill acceptor and card reader 201. At the same time, the card 250 may remain inserted in the card reader 202. The card 250 may therefore be accessed from time to time to allow further credits to be transferred to the host device 208. A capability is also preferably provided to allow currency deposited by a user to result in credit being applied to the card 250. Accordingly, as illustrated in FIG. 6, and particularly steps 620 and 622 thereof, the combined bill acceptor and card reader 201 awaits the user's insertion of currency or else instruction to transfer credit from the card 250 to the host device 208. If currency is deposited by the user, then, as indicated by step 621, upon validation of the currency (e.g., bill) the card 250 is directly credited by the card reader 202.

Thus, in the cashless mode, the card reader 202 intercepts the cash transaction data across the B.V. bill validator interface 203 and, rather than conveying the cash transaction data to the host device 208, interprets the cash transaction data (according to the particular cash transaction protocol, such as the well known B.V. bill validator protocol) and applies the appropriate amount to the card 250.

If, on the other hand, the user desires to transfer additional credit from the card 250 to the host device 208, the user indicates such a desire by, e.g., entering commands on a keypad or other user interface that is present at the host device 208. The user may, for example, be allowed to enter any possible credit amount by pressing the appropriate keys in a numeric keypad, or else may be required to select from among a number of pre-defined credit denominations associated with an array buttons (or a single button that can be depressed multiple times to sequentially alter the credit amount) at the host device 208. The details of how the user indicates the desire to transfer the credit are not particularly significant to the overall operation of the various embodiments described herein. When the user indicates an amount of credit to be transferred to the host device 208, the card reader 202 removes the amount of credit from the card 250 via the smart card interface 211, and transfers the cashless transaction data pertaining to the credit amount across the host connection 207 to the host device 208 via the host interface device 214, as indicated by step 623 in FIG. 6.

In a preferred embodiment, the combined bill acceptor and card reader 201 continues to await either the deposit of currency or the command to transfer additional credit, until receiving a command to eject the card 250 or else to either "cash out" or transfer the collected credit at the host device 208 back to the card 250. These commands may originate in a variety of different ways. For example, a user button or other user-activated means may be provided as part of the combined bill acceptor and card reader 201 to eject the card 250 immediately when the user desires. Preferably, in such an embodiment, the card 250 is only used to credit the host device 208, and is unable to receive collected credit back from the host device 208. Rather, any collected credit (i.e., the "purse") is paid out by the host device 208 in a standard manner, in the form of cash or, particularly in the case of an electronic gaming machine, casino chips.

In another embodiment, a "cash-out" command is provided as part of the protocol between the host device 208 and the card reader 202, which instructs the card reader 202 to place a certain amount of collected credit on to the card 250 and then to automatically eject the card 250 from the smart card interface 211. In such an embodiment, a button or other user-activated means may be provided as part of the host device 208 to signal the host device 208 that the user desires to cash out by crediting the user's card 250. When the host device 208 receives a cash-out request from the user, it relays a cash-out command to the card reader 202.

In yet another embodiment, an additional interface (not shown in FIG. 2), which may be referred to as the host/cash-out interface, is provided between the host device 208 and the coin (or currency) dispenser (not shown in FIG. 2) to allow for collected credit (i.e., the "purse") to be paid out to the user's card 250. The host/cash-out interface may be provided as part of the combined bill acceptor and card reader 201. Generally, in a cash-based electronic gaming device, a "purse" command is issued to the coin dispenser (also known as a coin dropper) to instruct the coin dispenser to pay out any accumulated credit. In the embodiment in which a host/cash-out interface is utilized, when the host device 208 issues a "purse" command, the host/cash-out interface intercepts the purse command and, if in a cashless mode, re-directs the purse command to the card reader 202. The purse command generally includes the amount of cash (or in this case, credit) to be given to the player. In response to the purse command, the card reader 202 places the appropriate amount of credit on the card 250 via the smart card reader 211. On the other hand, if in a cash mode, the host/cash-out interface simply allows the purse command to pass through to the coin dispenser, which then returns the appropriate amount of currency to the player, according to techniques well known in the art of electronic gaming machines.

In yet another embodiment, in order to cash out, the host device 208 instructs a coupon printer (which may be local at the host device 208 or else in a centralized cashier's station) to print a coupon or ticket with the appropriate purse amount indicated thereon. The use of coupon or ticket printers to perform cash-out is known in the art of electronic gaming machines; such a system is described, for example, in International Patent Application WO 98/59311 published Dec. 30, 1998, hereby incorporated by reference as if set forth fully herein.

In one aspect, the card reader 202 acts as a "master" device, while the bill acceptor 204 acts as a "slave" device, since the card reader 202 preferably determines whether the combined bill acceptor and card reader 201 operates in a cash mode or a cashless mode. When in a cash mode, the card reader 202 effectively "self-disables" until the cash transaction is completed. On the other hand, when in a cashless mode, the card reader 202 disables the bill acceptor 204 until the cashless transaction is completed, and then preferably re-enables the bill acceptor 204 to allow either cash or credit transactions to occur so long as the card 250 remains inserted in the card reader 202. When the card 250 is removed from the card reader 202, the combined bill acceptor and card reader 201 re-enters a standby mode. The card reader 202 may be viewed as providing "soft routing" of cash transaction data from the bill acceptor 204 to the host device 208, as at least some software-based logic and processing is used in connection with the transfer of the cash transaction data from bill acceptor interface 212 to host device interface 214, and onward to the host device 208.

In a preferred embodiment, the card reader 202 incorporates a variety of safety and security features as described in copending U.S. patent application Ser. No. 09/456,021, previously incorporated by reference as if set forth fully herein. Among other safety and security features, the card reader 202 preferably comprises an internal security and authentication module (SAM) 217 including one or more cashless "meters" for maintaining cashless transaction histories, which are preferably "locked" securely within the internal SAM 217 and can only be read out under limited circumstances. For example, an operator having a "master" card providing certain privileges could potentially be permitted to read out data from the internal SAM 217.

In one embodiment, the internal SAM 217 is constructed as a completely integral component encased in a secure housing (similar to an integrated chip), but with external electrical contacts for connection to other devices within the card reader 202. The SAM 217 may include interface circuitry, which may be compatible with a standard interface protocol such as, e.g., ISO 7816 interface standards. The internal SAM 217 may include a processor, program and data memory, and an electrically erasable programmable read-only memory (EEPROM), or other form of non-volatile, erasable memory, for storing programming code or data that may need to be kept even if power is removed from the gaming device. The EEPROM within the SAM 217 may be used to store the various cashless meters (in the form of program variables). Once stored, the cashless meters cannot be changed or cleared without proper access to the SAM 217, which may require a special electronic card (e.g., a specially programmed smart card) giving the holder access privileges. The cashless meters inside the SAM 217 may be in addition to any cash meters maintained by the host device 208.

Figure 12:
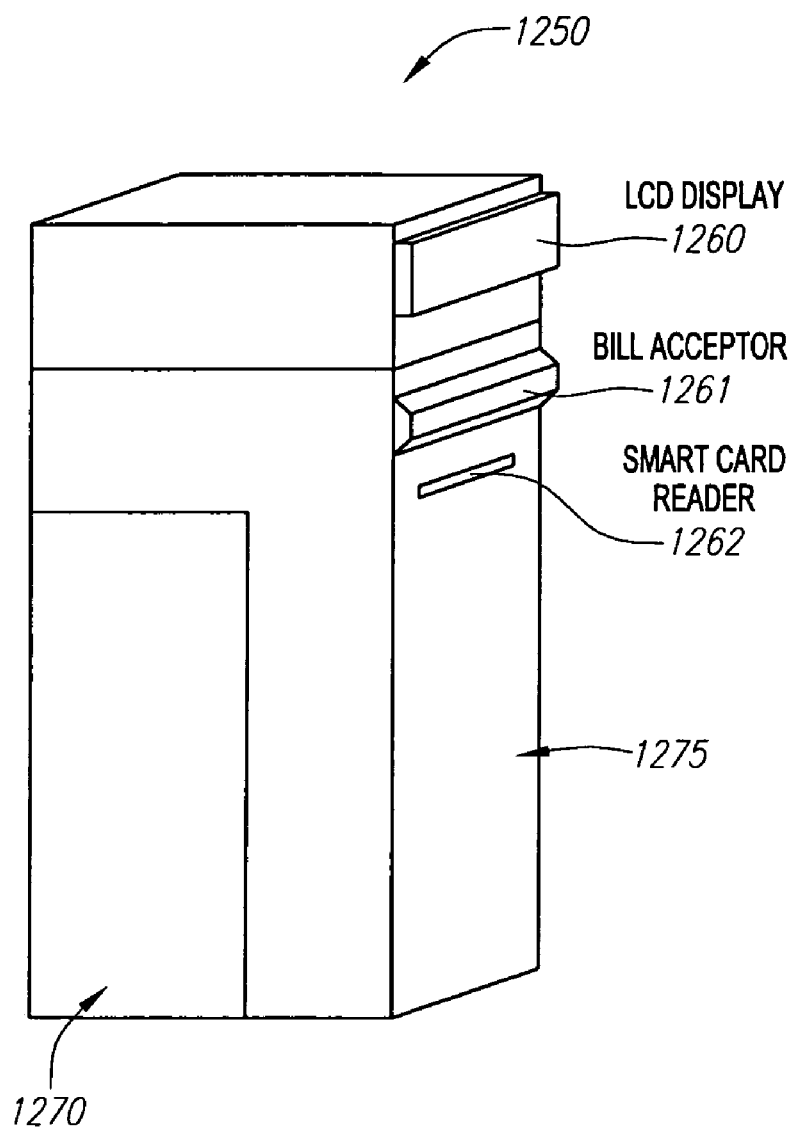
FIG. 12 is an oblique view diagram of a combined bill acceptor and card reader.

A combined bill validator and card reader also preferably includes secure meters housed in an external unit, as illustrated, for example, in the diagram of FIG. 12, which shows an oblique view of an example of combined bill acceptor and card reader 1250 having a removable secure meter unit (or "cassette") 1270. As illustrated in FIG. 12, the combined bill acceptor and card reader 1250 has a front panel 1275 with a bill acceptor slot 1261 and a smart card slot 1262. The combined bill acceptor and card reader 1250 may also have a graphical display 1260, such as liquid crystal display (LCD) or other similar mechanism. When it becomes necessary to read out cashless and/or cash transaction information that has accumulated over time in the combined bill acceptor and card reader 1250, the entire removable secure meter unit 1270 may be detached from the combined bill acceptor and card reader 1250, and replaced with another such removable secure meter unit 1270. In this manner, quick and simple collection of electronic transaction histories may be obtained. The removable secure meter units 1270 from many different host devices may be brought together at a centralized location and analyzed at the convenience of the owner of the devices. An example of external SAM meters 218 as may be associated with the removable secure meter units 1270 are illustrated also as part of the combined bill acceptor and card reader 201 shown in FIG. 2. However, the external SAM meters 218, while useful, are not essential to the overall functionality of the combined bill acceptor and card reader 201.

Figure 13:
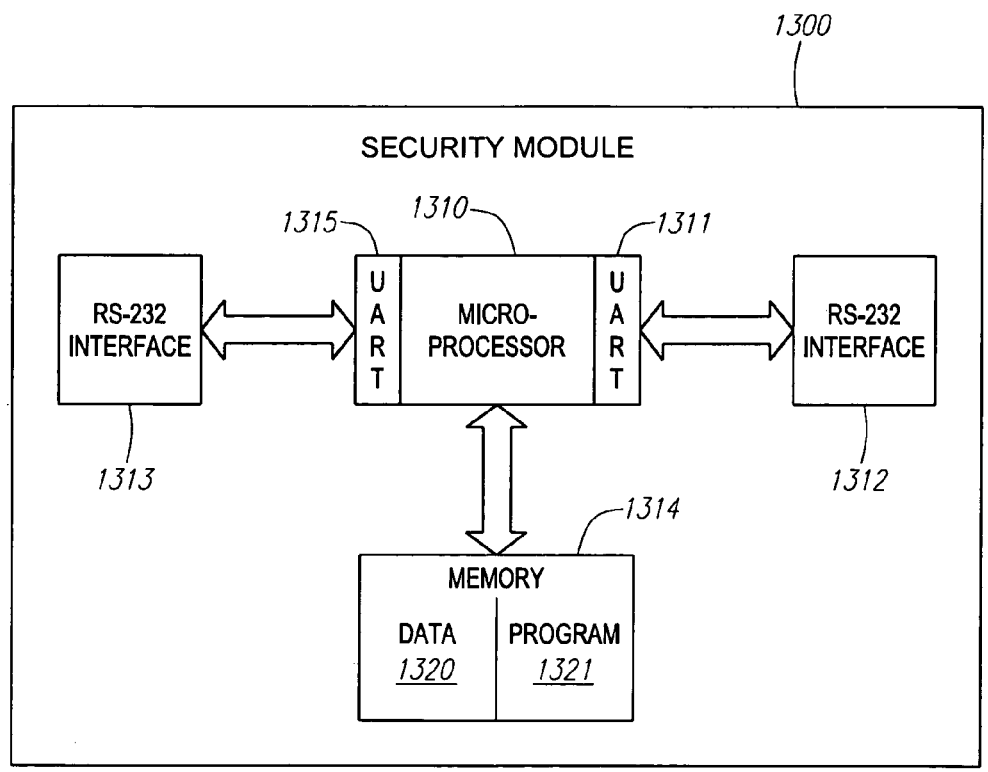
FIG. 13 is a diagram of a security module for authenticating and verifying data cards when first inserted in a reader and, potentially with transactions thereafter.

In one or more embodiments as disclosed herein, the combined bill acceptor and card reader 201 may also comprise, or interface with, a special security module which authenticates and verifies cards 250 when first inserted in the smart card reader 211 and, potentially, in connection with each cashless transaction thereafter until the card 250 is removed. A preferred embodiment of a security module 1300 for such a purpose is illustrated in FIG. 13. As shown in FIG. 13, the security module 1300 comprises a first interface 1313 (such as an RS-232 serial communication port), which is connected to the combined bill acceptor and card reader 201, a microprocessor 1310, a memory 1314 (which is divided into data memory 1320 and program memory 1321), and a second communication interface 1312 (such as an RS-232 serial communication port), which is connected to the game device processor. Two communication port managers 1311, 1315 (each of which may take the form of a universal asynchronous transceiver/receiver (UART)) are resident with the microprocessor 1310, for handling communications over the communication interfaces 1312 and 1313, respectively. Alternatively, the communication port managers (e.g., UARTs) 1311, 1315 may be located off-chip from the microprocessor 1310.

In a preferred embodiment, the microprocessor 1310 of the security module 1300 is programmed to, among other things, perform one side of a cross-authentication check when a gaming session starts, and periodically thereafter. Programming instructions for its part of the cross-authentication check are stored in program memory 1321. Likewise, programming instructions for the counterpart of the cross-authentication check conducted by the combined bill acceptor and card reader 201 are stored in the program memory (EEPROM 215 or RAM 216) of the card reader 202.

Figure 15:
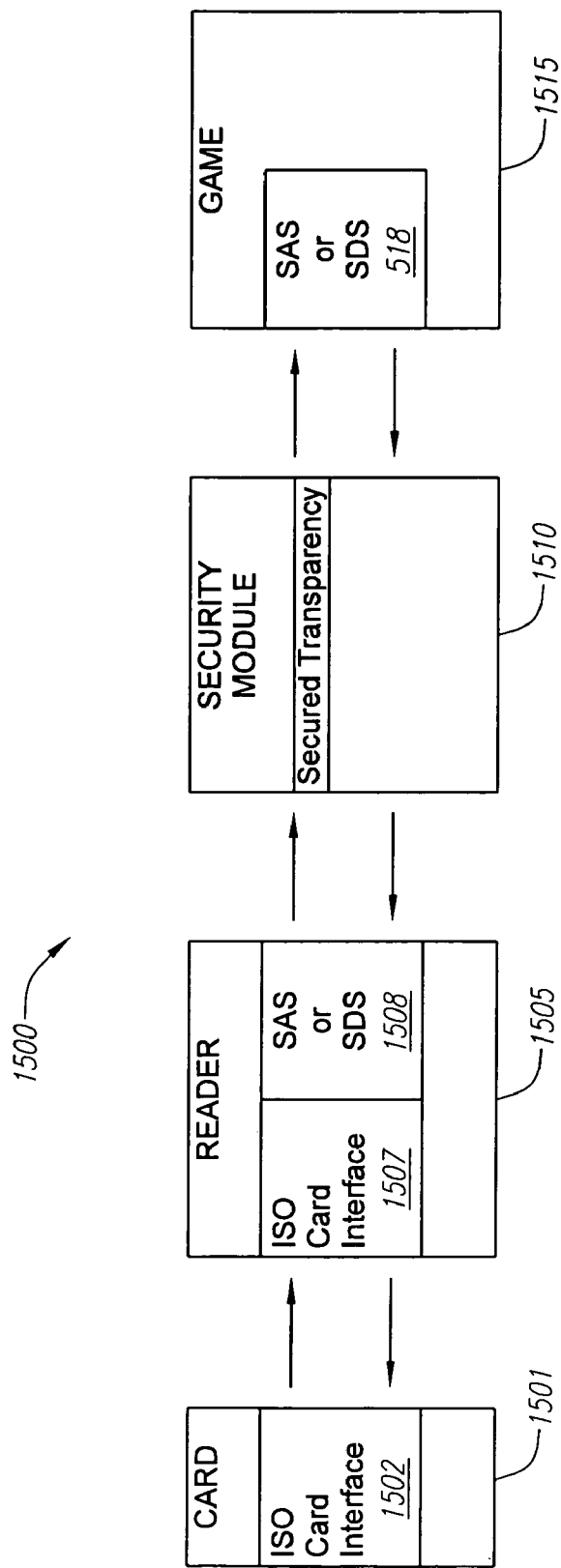
FIG. 15 is a conceptual diagram illustrating various interfaces among components of the cashless portion of a combined bill acceptor and card reader system, with application to an electronic gaming machine as the host device.

FIG. 15 is a conceptual diagram illustrating the different interfaces among some of the primary components of the cashless portion of a combined bill acceptor and card reader system 200, with specific application to an electronic gaming machine as the host device 208. As shown in FIG. 15, a smart card 1501 is configured to communicate according to a standard (e.g., ISO) card interface protocol 1502. An card reader 1505 (which may be, for example, card reader 202 shown in FIG. 2) is configured to communicate with the smart card 1501 using the same standard (e.g., ISO) card interface protocol 1507. The card reader 1505 is also configured to communicate with a security module 1510 using a standard gaming device interface protocol 1508, such as SAS or SDS, for example, both of which are conventional and well known in the field of gaming devices. The security module 1510 is configured so as to allow pass-through communication (i.e., transparency), once cross-authentication and validation checks have occurred. The card reader 1505 thereby communicates with a gaming device processor (located in the host device 208), which is also configured to communicate using a standard gaming device interface protocol 1518, such as SAS or SDS.

Figure 14:
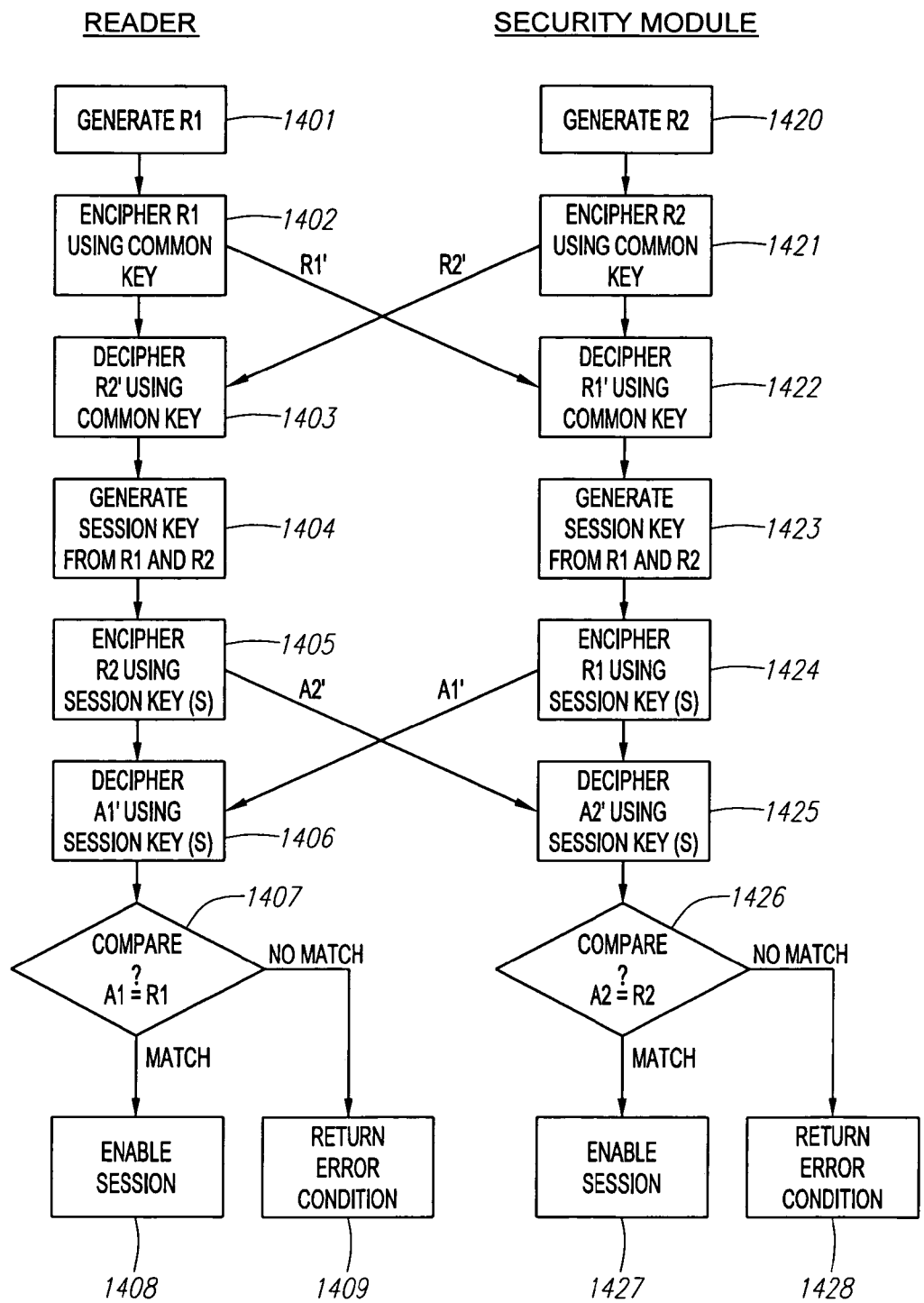
FIG. 14 is a process flow chart of a preferred cross-authentication procedure as may be carried out between a card reader and a security module.

FIG. 14 is a process flow chart of a preferred cross-authentication procedure as may be carried out between a card reader (e.g., card reader 202 shown in FIG. 2 or card reader 1505 shown in FIG. 15) and the security module (e.g., security module 1300 shown in FIG. 13 or security module 1510 shown in FIG. 15), or between the card reader 202 or 1505 and a portable data device (e.g., a smart card). For convenience, the following explanation will be presented in the context of the system 1500 depicted in FIG. 15. As illustrated in FIG. 14, in a first step 1401, a random number R1 is generated by the card reader 1505. In a next step 1402, the random number R1 is enciphered by the card reader 1505 using a common key (which may be stored in SAM 217), yielding enciphered random number R1'. Concurrently, in step 1420, a random number R2 is generated by the security module 1510, and in a following step 1421, the random number R2 is enciphered by the security module 1510 using the same common key, yielding enciphered random number R2'. The enciphered random numbers R1', R2' are then exchanged by the card reader 1505 and the security module 1510. In step 1403, the card reader 1505 deciphers enciphered random number R2' using the common key, thus obtaining the original random number R2, and generates a session key S from R1 and R2 in step 1404. Likewise, in step 1422, the security module 1510 deciphers enciphered random number R1' using the common key, thus obtaining the original random number R1, and generates the same session key S from R1 and R2 in step 1423, using the same algorithm to do so as the card reader 1505.

In step 1405, after the session key S has been generated, random number R2 is enciphered by the card reader 1505 using the session key S, yielding an enciphered resultant A2'. Similarly, in step 1424, random number R1 is enciphered by the security module 1510 using the session key S, yielding an enciphered resultant A1'. The enciphered resultants A1' and A2' are exchanged by the card reader 1505 and the security module 1510. In step 1406, the card reader 1505 deciphers enciphered resultant A1' received from the security module 1510, while in step 1425 the security module 1510 deciphers enciphered resultant A2' received from the card reader 1505. In step 1407, the card reader 1505 compares the deciphered resultant R1 against its originally generated random number R1. If a match is found, then, in step 1408, the gaming session (or other activity) is enabled, while if no match is found an error condition is returned in step 1409. Similarly, in step 1426, the security module 1510 compares the deciphered resultant R2 against its originally generated random number R2. If a match is found, then, in step 1427, the gaming session (or other activity) is enabled, while if no match is found an error condition is returned in step 1428. The results of each part of the cross-authentication check may be shared between the card reader 1505 and the security module 1510.

If either part of the cross-authentication check fails, then the security module 1510 will not open up the communication pathway to the electronic gaming machine 1515, and the player will essentially be locked out from utilizing the electronic gaming machine 1515. Similarly, if either part of the cross-authentication check fails, then the card reader 1505 is programmed to prevent communication with the electronic gaming machine 1515 and to shut down its further communication with the card 1501. Thus, even if the security module 1510 were physically bypassed (for example, by wires) after a gaming session had started, the periodic cross-check would determine that the security module 1510 was no longer present, and the card reader 1505 would not allow the gaming session (or other activity) to continue.

Figure 16:
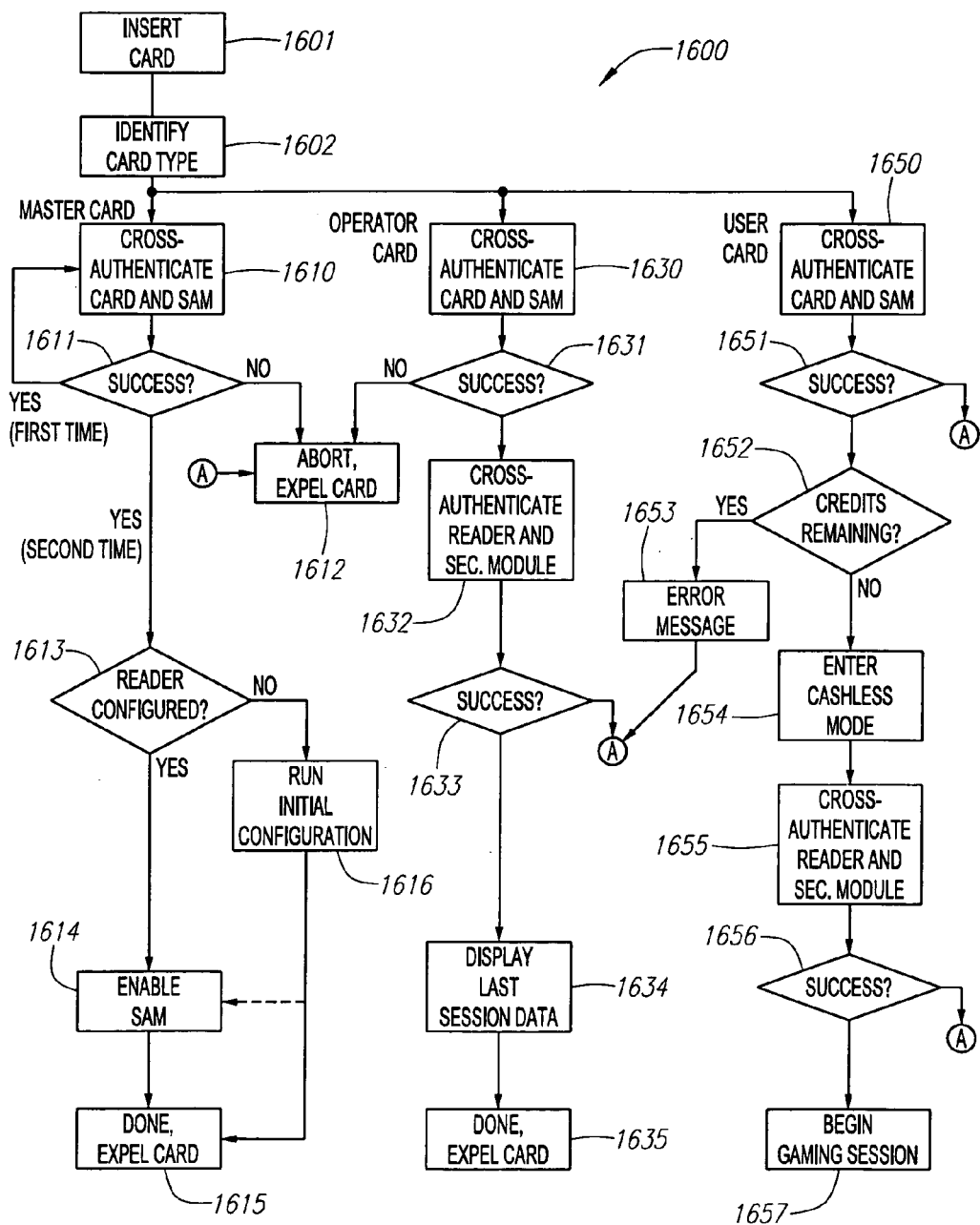
FIG. 16 is a flow chart diagram illustrating the operation of a gaming system in accordance with a preferred embodiment as described herein.

FIG. 16 is a flow chart diagram illustrating the operation of a gaming system in accordance with a preferred embodiment as described herein. The flow chart diagram of FIG. 16 will be described in relation to the system 1500 illustrated in FIG. 15, but its principles may be applied to other embodiments, such as the embodiment illustrated in FIG. 2.

As illustrated in FIG. 16, in a first step 1601 of the operation of the gaming system, a card (e.g., a smart card) 1501 is inserted into the card reader 1505. In a preferred system embodiment, the card 1501 may be one of several types. The card 1501 may be, for example, a user card, a master card, or an operator card, each of which has various functions and associated access privileges. In a next step 1602, the card reader 1505 identifies the type of card. This identification process may be accomplished by reading the response from the card reader 1505.

If the input is identified as a master card, then the process moves to step 1610, wherein the card 1501 is cross-authenticated with the card reader 1505 and, more specifically, with the security and authentication module (SAM) (shown, for example, as SAM 217 in the embodiment of FIG. 2). For the cross-authentication referred to in step 1610, the internal processor of the card reader 1505 acts as an intermediary between the processor located on the master card and the processor located in the SAM. A first common key is used for this cross-authentication check, which may be carried out, for example, in accordance with the same general techniques described above with respect to FIG. 14. If the cross-authentication check fails, then, moving to step 1612, the process is aborted and the card 1501 is expelled. The cross-authentication check may be done multiple times (twice, in the example shown) to increase security.

If the cross-authentication check succeeds, the process then moves to step 1613, wherein the master card checks whether the electronic gaming machine 1515 has been initialized and, specifically, whether the card reader 1505 has been initially configured. If not, then an initial configuration is run in step 1616, whereby the card reader 1505 is "matched" to the security module 1510 by downloading the unique security module identifier to the SAM (located in the card reader 1505). Once the SAM has been loaded with the unique security module identifier, the SAM and security module 1510 jointly build a second common key for subsequent use in later authentication checks, and the card reader 1505 thereby becomes uniquely associated with the particular security module 1510 for the electronic gaming machine 1515. If the card reader 1505 has not been initially configured, then there is no way for a player with a user card to attempt to cross-authenticate with the security module 1510, and no way for the player to utilize the electronic gaming machine 1515 (or other type of host device).

Once the card reader 1505 has been initially configured and associated with the security module 1510, the SAM may be enabled using the master card. The SAM preferably is programmed so that it needs to be re-enabled by the master card whenever the electronic gaming machine 1515 is reset or whenever power is removed from the electronic gaming machine 1515.

If the inserted card 1501 is an operator card, then the process moves to step 1630, wherein the card and SAM carry out a cross-authentication as described above for the master card. Alternatively, one-way authentication of the operator card (but not the SAM) may be performed. If the cross-authentication or one-way authentication check not successful, the process aborts and the card 1501 is expelled. Otherwise, the card reader 1505 may perform a second cross-authentication, this time with the security module 1510 itself (although this step 1632 may be skipped, if desired, since the operator card generally does not attempt to communicate with the electronic gaming machine processor). In particular, the second cross-authentication, if done, may be carried out between the SAM and the security module 1510, using the second common key that is stored in the SAM and in the security module 1510 (and developed during initial configuration). The cross-authentication check may be carried out according to the process shown in FIG. 14 and described later herein. If not successful, the process aborts. Otherwise, the card reader 1505 displays gaming session data (or other types of internally stored data, as desired) from the last several sessions. In one embodiment, for example, the card reader 1505 displays the total gaming session results from the last five sessions, as well as the most recent results from the last several gaming transactions associated with the most recent gaming session. The operator card can thereby be used by gaming establishment personnel on the floor to check wins, losses, jackpots and the like that have recently occurred at a machine. The gaming session data may be automatically scrolled through by the card reader 1505, or else, if a keypad or keyboard is provided, the operator may select which gaming session information to display. In addition to its other functions, the master card may also be provided with the same privileges as an operator card.

If the card 1501 inserted is a user card, then the process moves to step 1650, wherein cross-authentication between the card 1501 and the SAM is carried out in a manner similar to that described for the master card. If not successful, the process aborts. Otherwise, the card reader 1505 queries the electronic gaming machine 1515 to see whether any credits (i.e., coins or other cash input) remain. If so, then a message to that effect is displayed in step 1653, and the process aborts with the user card being expelled. Otherwise, the card reader 1505 instructs the electronic gaming machine 1515 to enter a cashless mode, and refuse to accept cash directly (assuming it is configured to do so) until the end of the gaming session. Once cashless mode is entered, in step 1655 a second cross-authentication is carried out, this time between the card reader 1505 and the security module 1510. More particularly, the cross-authentication is carried out between the SAM and the security module 1510 using the second common key stored in the SAM and the security module 1510. The cross-authentication check may be carried out according to the process shown in FIG. 14 and described elsewhere herein. If the cross-authentication check fails, then the process aborts. Otherwise, in step 1657, a gaming session is allowed to begin.

Further details regarding a security module, and related authentication and verification functions, are described in copending U.S. patent application Ser. No. 09/456,021, previously incorporated by reference herein.

Figure 7:
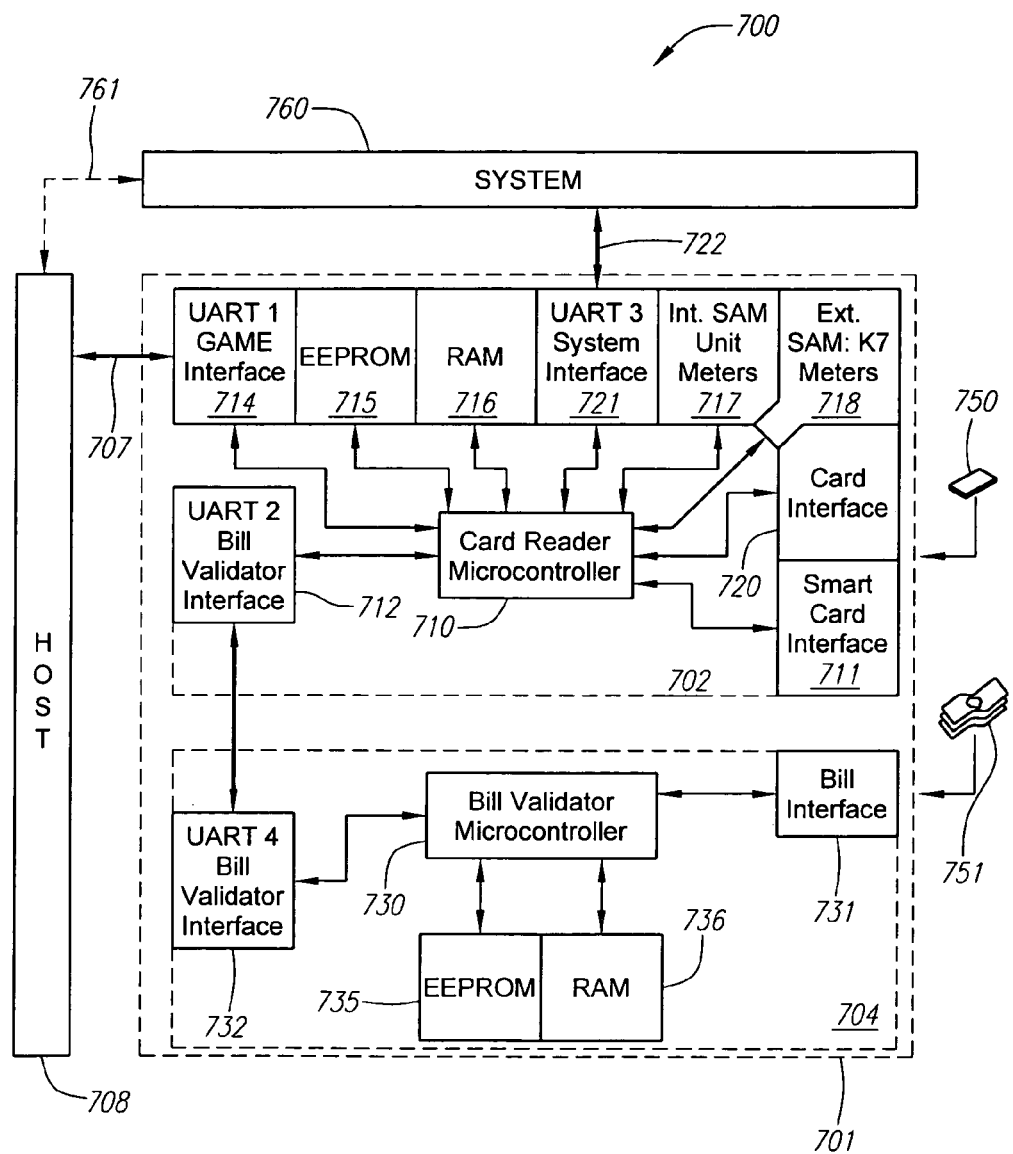
FIG. 7 is a diagram of another embodiment of a combined bill acceptor and card reader, having a connection to a central computer or processing station.

FIG. 7 is a diagram of another embodiment of a combined bill acceptor and card reader 700, having a connection to a central computer or processing station (referred to as "system" 760 in FIG. 7). As illustrated in FIG. 7, a combined bill acceptor and card reader 701 includes a card reader 702 and a bill acceptor 704, which contain any or all of the same types of components and functionality as the card reader 202 and bill acceptor 204 illustrated in FIG. 2. In addition, the combined bill acceptor and card reader 701 further includes a system interface device 721 which communicates with the system 760 (that is, a central computer of processing station) over a system interface 722. The system interface device 721 may comprise any type of interface, serial or parallel; in a preferred embodiment, it comprises a serial interface such as a universal asynchronous receiver/transmitter (UART). The system 760 may comprise a local area network (LAN) and may include, for example, an Ethernet adapter or other means for allowing communication over the local area network. Provision of a system interface 722 allows the card reader 702 to record cashless transactions directly with the system 760, thereby alleviating the need to read out or otherwise acquire cashless transaction data at a later time. Furthermore, the card reader 702 may communicate with the host device 708 using an electronic gaming machine protocol, such as SAS or SDS, or another type of system protocol, via the system interface 760 and connection 761. In all other respects, the combined bill acceptor and card reader 701 shown in FIG. 7 behaves in a manner analogous to the combined bill acceptor and card reader 201 of FIG. 2.

Figure 11:
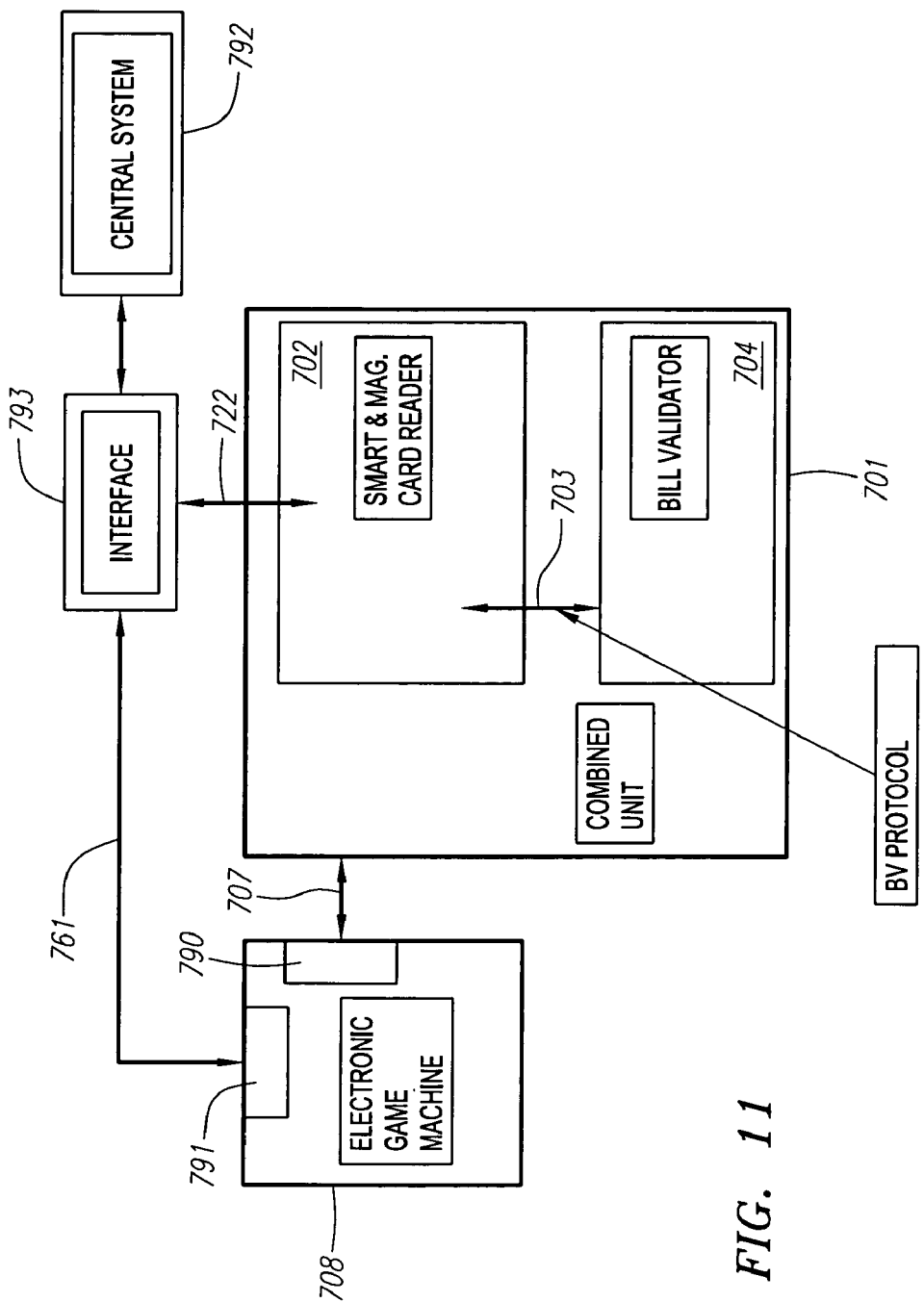
FIG. 11 is a conceptual block diagram illustrating operation of another embodiment of a combined bill acceptor and card reader such as that depicted in FIG. 7, in an on-line situation.

FIG. 11 is a conceptual diagram illustrating operation of a combined bill acceptor and card reader similar to that shown in FIG. 7. As shown in FIG. 11, the card reader 702 may communicate directly with the host device 708 (e.g., electronic gaming machine) across host interface 707, or else may communicate with the host device 708 across system interface 722. In FIG. 11, the central computer system is divided into a network adapter or interface 793 (such as an Ethernet adapter) and a central system 792. The host interface 707 may, but need not, support both bill validator and electronic fund transfer (EFT) protocol functionality. Rather, the host interface 707 may support bill validator protocol functionality, while electronic fund transfer protocol functionality may be supported by communication over system interface 722 and connection 761 to a system communication port 791.

Figure 8:
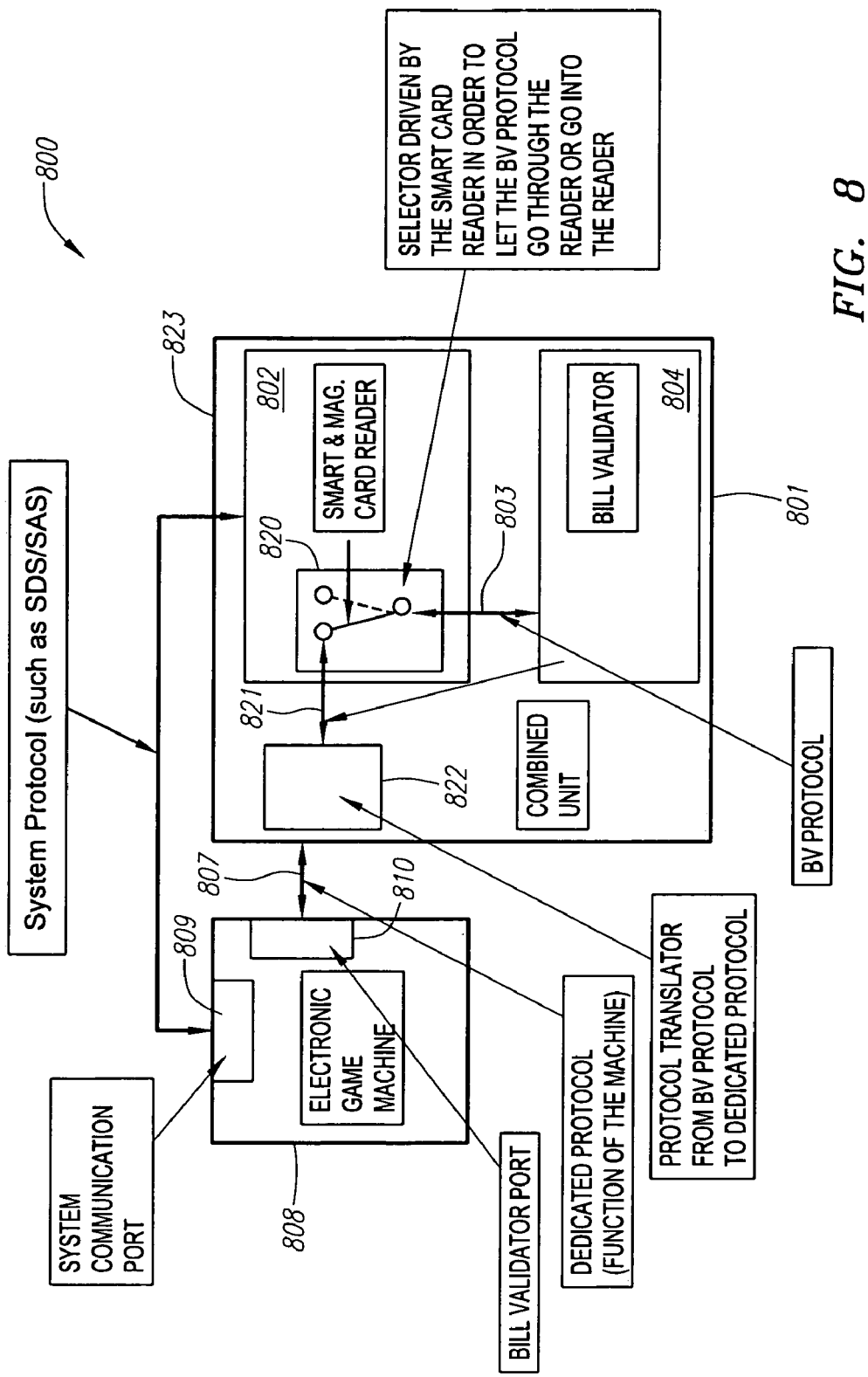
FIG. 8 is a block diagram of another embodiment of a combined bill acceptor and card reader, in an off-line situation.

FIG. 8 is a conceptual block diagram illustrating operation of another embodiment of a combined bill acceptor and card reader system 800, in an off-line situation. In FIG. 8, a combined bill acceptor and card reader 801 comprises a card reader 802 and a bill acceptor 804, similar, but not identical, in functionality and composition to the card reader 202 and bill acceptor 204 of FIG. 2. The card reader 802 and bill acceptor 804 communicate over a B.V. bill validator interface 803. The combined bill acceptor and card reader 801 communicates over a host interface 807 with a host device 808. An optional protocol translator 822 may be provided as part of the combined bill acceptor and card reader 801, to translate, if necessary, from the B.V. bill validator protocol to a dedicated protocol of the host device 808. The card reader 802 can also communicate directly with the host device 808 via a system communication port 809 using a system protocol, such as SAS or SDS, for example, or any other suitable protocol.

A difference between the combined bill acceptor and card reader 801 and the analogous device in FIG. 2 is that the card reader 802 of the combined bill acceptor and card reader 801 in FIG. 8 has a relay 820 or other electronic switch or selector, but does not include a bill acceptor interface device or host interface device in the card reader 802, in contrast to FIG. 2. Rather, in operation, the relay 820 normally remains in a first position (e.g., closed position) such that cash transaction data is communicated directly from the bill acceptor 804 to the host device 808 over the B.V. bill validator interface 803, relay 820, protocol translator 822 and host interface 807. Since relay 820 is used to route the data from the bill acceptor 804, any possible error in transmission of the cash transaction data could be generally isolated (in the absence of a relay failure) to the bill acceptor 804, which can be an advantage when attempting to diagnose a system failure. When the card reader 802 detects the insertion of a smart card or other readable data unit, the card reader 802 causes the relay 820 to switch to a second position (e.g., open position) such that the pathway to the host device 808 from the bill acceptor 804 becomes temporarily open. The card reader 802 then communicates cashless transaction data over the system interface 823 to the system communication port 809 of the host device 808.

Figure 9:
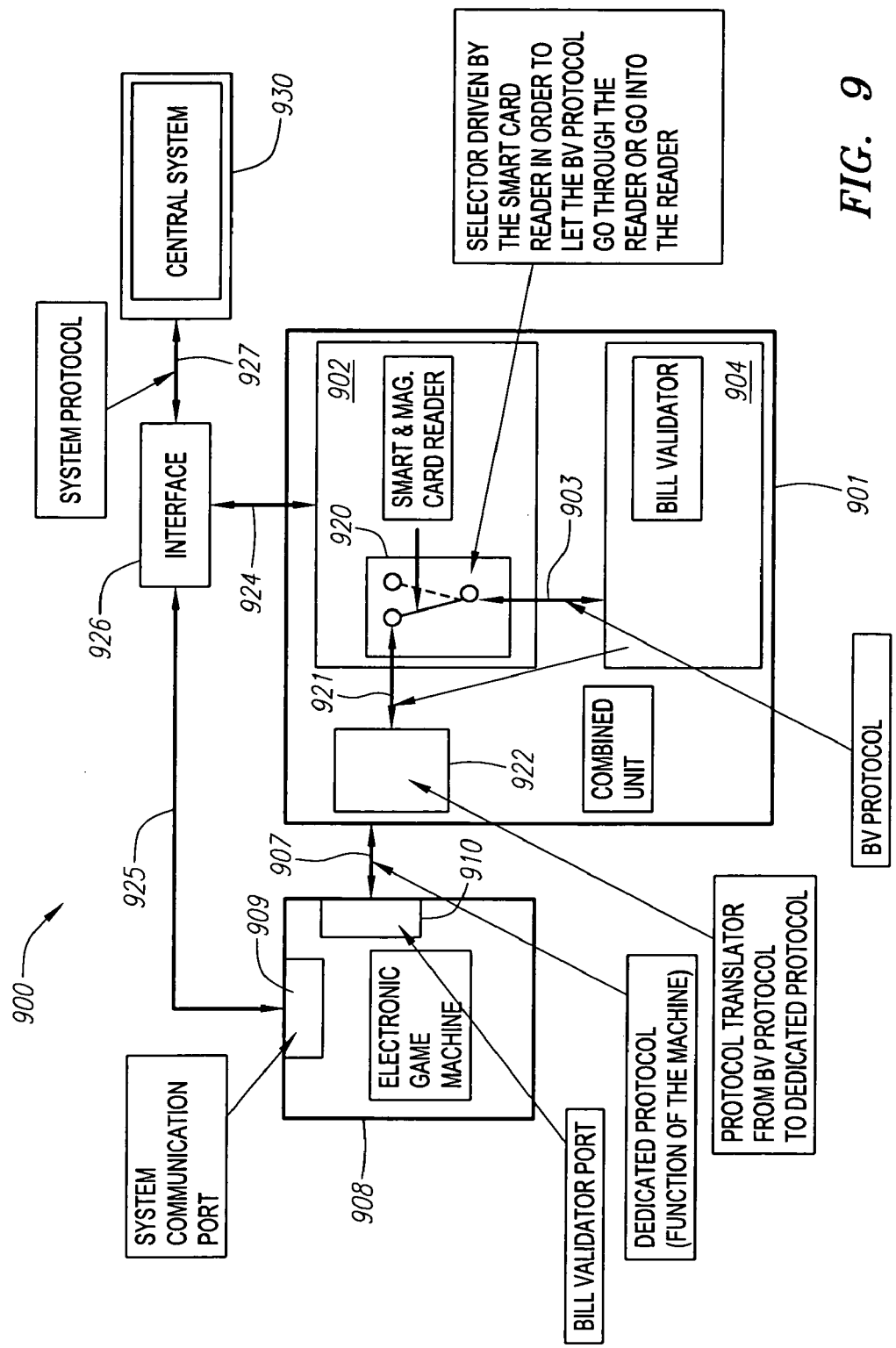
FIG. 9 is a block diagram of a combined bill acceptor and card reader similar to that depicted in FIG. 8, but in an on-line situation.

FIG. 9 is a conceptual block illustrating operation of a combined bill acceptor and card reader 901 similar to that of FIG. 8, but in an on-line situation. As illustrated in FIG. 9, the combined bill acceptor and smart card reader 901 comprises a card reader 902 and bill validator 904 similar, but not identical, in in functionality and composition to the card reader 202 or 802 and bill acceptor 204 or 804 of FIGS. 2 and 8, respectively. The card reader 902 and bill acceptor 904 communicate over a B.V. bill validator interface 903. The combined bill acceptor and card reader 901 communicates over a host interface 907 with a host device 908. An optional protocol translator 922 may be provided as part of the combined bill acceptor and card reader 901, to translate, if necessary, from the B.V. bill validator protocol to a dedicated protocol of the host device 908. The card reader 902 can also communicate with the host device 908 via an interface 926 connected to a system communication port 909 using a system protocol, such as SAS or SDS, for example, or any other suitable protocol.

Similar to the card reader 802 in FIG. 8, the card reader 902 of the combined bill acceptor and card reader 901 in FIG. 9 uses a relay 920 or other electronic switch or selector to route data to the host device 908. In normal operation, the relay 920 remains in a first position (e.g., closed position) such that cash transaction data is communicated directly from the bill acceptor 904 to the host device 908 over the B.V. bill validator interface 903, relay 920, protocol translator 922 and host interface 907. Since relay 920 is used to route the data from the bill acceptor 904, as noted above with respect to FIG. 8, any possible error in transmission of the cash transaction data could generally be isolated (in the absence of a relay failure) to the bill acceptor 904, which can be an advantage when attempting to diagnose a system failure. When the card reader 902 detects the insertion of a smart card or other readable data unit, the card reader 902 causes the relay 920 to switch to a second state (e.g., an open state) such that the pathway to the host device 908 from the bill acceptor 904 becomes temporarily open. The card reader 902 then communicates cashless transaction data over the system interface 926 to the system communication port 909 of the host device 908. The card reader 902 can also communicate cashless transaction data over the system interface 926 to a central computer system or network 930, using a system protocol such as SAS or SDS, for example, or any other suitable protocol.

It is apparent that a wide variety of useful apparatus and methods, in various embodiments, have been illustrated and described herein which have functionality to carry out both cash transactions and cashless transactions, in a secure and efficient manner. Embodiments suitable for off-line or on-line gaming have been described and illustrated herein, and a wide number of variations explained.

While the preferred embodiment of the method of this invention has been set forth above, it will be obvious to those skilled in the art that many modifications are possible to the embodiments disclosed without departing from the inventive concept claimed below. Therefore, this patent and the protection it provides is not limited to the embodiments set forth above, but is of the full scope of the following claims, including equivalents thereof.

What is claimed is:

1. A combined bill acceptor and data unit reader, comprising:
   a bill acceptor for receiving and validating currency, controlling a mechanical cash input mechanism, and generating digital cash transaction data according to a bill validator protocol;
   a host interface; and
   a data unit reader electronically interposed between said bill acceptor and said host interface, said data unit reader comprising a digital electronic bill acceptor interface for receiving digital cash transaction data from said bill acceptor according to the bill validator protocol, said data unit reader passing through cash transaction data from said bill acceptor to said host interface according to the bill validator protocol when currency is accepted by said bill acceptor, and transmitting cashless transaction data to said host interface according to a different protocol when a data unit is read by said data unit reader.

2. The combined bill acceptor and data unit reader of claim 1, wherein said host interface comprises a protocol translator, said protocol translator converting cash transaction data from a bill validator protocol to a protocol used by a host device connected to said host interface.

3. The combined bill acceptor and data unit reader of claim 1, wherein said data unit reader comprises a bill acceptor data interface connected to said bill acceptor, and a microprocessor, said microprocessor controlling the transfer of data between said bill acceptor data interface and said host interface.

4. The combined bill acceptor and data unit reader of claim 3, wherein said bill acceptor data interface and said host interface each comprise a universal asynchronous receiver/transceiver (UART).

5. The combined bill acceptor and data unit reader unit of claim 1, wherein said data unit reader comprises a smart card reader.

6. The combined bill acceptor and data unit reader of claim 5, wherein said smart card reader performs an authentication and validation procedure when a smart card is inserted in said smart card reader.

7. The combined bill acceptor and data unit reader of claim 1, wherein said host interface is connected to an electronic gaming machine.

8. The combined bill acceptor and data unit reader of claim 7, wherein said cashless transaction data is communicated by said host interface to said electronic gaming machine according to an electronic gaming machine protocol.

9. The combined bill acceptor and data unit reader of claim 1, wherein said data unit comprises a secured internal meter.

10. The combined bill acceptor and data unit reader of claim 9, wherein said secured internal meter is contained with a security and authentication module (SAM).

11. The combined bill acceptor and data unit reader of claim 1, further comprising a security module interposed between said data unit reader and a host device connected to said host interface, said security module permitting transparent communication between said data unit reader and said host device after completion of an authentication and validation process, and otherwise preventing communication between said data unit reader and said host device.

12. The combined bill acceptor and data unit reader of claim 1, further comprising a system interface by which said cashless transaction data may be communicated to a central computer controlling or monitoring a plurality of host devices.

13. A combined bill acceptor and data unit reader, comprising:
   a bill acceptor for receiving and validating currency, controlling a mechanical cash input mechanism, and generating digital cash transaction data according to a bill validator protocol;
   a host interface; and
   a data unit reader electronically interposed between said bill acceptor and said host interface, said data unit reader passing through cash transaction data from said bill acceptor to said host interface when currency is accepted by said bill acceptor, and transmitting cashless transaction data to said host interface when a data unit is read by said data unit reader;
   wherein said data unit reader comprises a relay across which electrical signals comprising cash transaction data are transmitted from the bill acceptor to said host interface according to the bill validator protocol, and wherein said data unit reader passes through cash transaction data from said bill acceptor to said host interface when said relay is in a first position, and prevents cash transaction data from passing through from said bill acceptor to said host interface when said relay is in a second position.

14. A multi-mode card reader, comprising:
   a card reader interface;
   a bill acceptor interface for communicating with a bill acceptor, the bill acceptor configured to receive and validate currency, to control a mechanical cash input mechanism, and to generate cash transaction data according to a bill validator protocol; and
   a card reader controller connected to said card reader interface and electronically interposed between said bill acceptor interface and a host interface, said card reader controller allowing transfer of cash transaction data from said bill acceptor interface to said host interface when said cash transaction data is received from said bill acceptor interface and said card reader controller is in a first mode, said first mode associated with cash transaction processing, and allowing transfer of cashless transaction data from said card reader interface to said host interface when said cashless transaction data is received from said card reader interface and said card reader controller is in a second mode, said second mode associated with cashless transaction processing;

wherein said card reader controller is programmed to block cashless transaction data from being electronically conveyed via said card reader interface when in said first mode.

15. The multi-mode card reader of claim 14 further comprising a relay across which electrical signals comprising cash transaction data are transmitted from the bill acceptor to said host interface according to the bill validator protocol, wherein said relay passes through cash transaction data from said bill acceptor interface to said host interface when in a first position, and prevents cash transaction data from passing from said bill acceptor interface to said host interface when in a second position.

16. The multi-mode card reader of claim 15, wherein said host interface comprises a protocol translator, said protocol translator converting cash transaction data from the bill validator protocol to a protocol used by a host device connected to said host interface.

17. The multi-mode card reader of claim 15, wherein said relay switches from said first position to said second position when said card reader interface detects insertion of a portable electronic card, thereby temporarily preventing cash transaction data from passing from said bill acceptor interface to said host interface.

18. The multi-mode card reader of claim 14, wherein said bill acceptor data interface and said host interface each comprise a universal asynchronous receiver/transceiver (UART).

19. The multi-mode card reader unit of claim 14, wherein said card reader interface is configured to read smart cards.

20. The multi-mode card reader of claim 14, wherein said bill acceptor interface receives said cash transaction data according to the bill validator protocol.

21. The multi-mode card reader of claim 14, wherein said host interface is connected to an electronic gaming machine.

22. The multi-mode card reader of claim 14, further comprising a secured internal meter.

23. The multi-mode card reader of claim 22, wherein said secured internal meter is contained with a security and authentication module (SAM).

24. The multi-mode card reader of claim 14, wherein when in said second mode, cash transaction data received at said bill acceptor interface is used to credit a card inserted in said card reader interface.

25. The multi-mode card reader of claim 14, further comprising a system interface by which said cashless transaction data may be communicated to a central computer controlling or monitoring a plurality of host devices.

26. A method for controlling cash and cashless transactions at a combined bill acceptor and card reader, comprising the steps of:
receiving a card at a card reader;
processing data on said card and generating cashless transaction data thereby;
receiving cash at a bill acceptor;
generating cash transaction data in response to the receipt of cash at the bill acceptor;
transmitting said cash transaction data to said card reader;
selecting between at least a cash mode and cashless mode;
when in said cash mode, relaying said cash transaction data to a host device interface; and
when in said cashless mode, transmitting said cashless transaction data to said host device interface.

27. The method of claim 26, further comprising the step of switching from a standby mode to said cash mode when cash transaction data is received at said card reader, and switching from said standby mode to said cashless mode when a card is received at said card acceptor.

28. The method of claim 26, further comprising the step of adding credit to a card received at said card acceptor in response to receiving cash transaction data at said card reader when in said cashless mode.

29. The method of claim 26, wherein said step of relaying said cash transaction data to said host device interface further comprises the step of relaying said cash transaction data to an electronic gaming machine, and wherein said step of transmitting said cashless transaction data to said host device interface further comprises the step of transmitting said cashless transaction data to said electronic gaming machine.

30. The method of claim 26, wherein said step of relaying said cash transaction data to said host device interface comprises the step of relaying said cash transaction data via a relay to said host device interface when said relay is in a closed position, and wherein said step of transmitting said cashless transaction data to said host device interface is carried out when said relay is in an open position.

31. The method of claim 26, wherein said step of relaying said cash transaction data to a host device interface comprises the step of transmitting cash transaction data according to a B.V. bill validator protocol.

32. The method of claim 26, wherein said step of transmitting said cashless transaction data to said host device interface comprises the step of transmitting said cashless transaction data according to a standard gaming protocol.

33. The method of claim 26, wherein said step of receiving said card at said card reader comprises the step of receiving a smart card at a smart card reader.

34. The method of claim 26, further comprising the step of transmitting said cashless transaction data via a system interface to a central computer controlling or monitoring a plurality of host devices.

35. A combined bill acceptor and smart card reader, comprising:
a bill acceptor configured to receive and validate currency, to control a mechanical cash input mechanism, and to generate cash transaction data according to a bill validator protocol;
a host interface; and
a smart card reader electronically interposed between said bill acceptor and said host interface, said smart card reader comprising a digital bill acceptor interface for receiving digital cash transaction data from said bill acceptor according to the bill validator protocol, said smart card reader passing through cash transaction data from said bill acceptor to a separate host device microprocessor via said host interface when currency is accepted by said bill acceptor and said smart card reader is in a cash mode, and transmitting cashless transaction data to said host device microprocessor via said host interface according to a cashless protocol when a smart card is read by said smart card reader and said smart card reader is in a cashless mode.

36. The combined bill acceptor and smart card reader of claim 35, wherein said smart card reader operates in a plurality of modes including a standby mode, said smart card reader switching from said standby mode to said cash mode when receiving cash transaction data from said bill acceptor, and switching from said standby mode to said cashless mode upon insertion of said smart card.

37. The combined bill acceptor and smart card reader of claim 36, wherein, when in said cashless mode, said smart card reader adds credit to said smart card upon receiving cash transaction data from said bill acceptor.

38. The combined bill acceptor and smart card reader of claim 37, wherein said smart card reader temporarily disables said bill acceptor when reading credit information from said smart card.

39. The combined bill acceptor and smart card reader of claim 35, wherein said smart card reader comprises a relay across which electrical signals comprising cash transaction data are transmitted from the bill acceptor to said host interface according to the bill validator protocol, and wherein said smart card reader passes through cash transaction data in the bill validator protocol from said bill acceptor to said host interface when said relay is in a first position associated with said cash mode, and prevents cash transaction data from passing through from said bill acceptor to said host interface when said relay is in a second position associated with said cashless mode.

40. The combined bill acceptor and smart card reader of claim 35, wherein said host interface comprises a protocol translator, said protocol translator converting cash transaction data from a bill validator protocol to a protocol used by a host device connected to said host interface.

41. The combined bill acceptor and smart card reader of claim 35, wherein said smart card reader comprises a bill acceptor data interface connected to said bill acceptor, and a microprocessor, said microprocessor controlling the transfer of data between said bill acceptor data interface and said host interface.

42. The combined bill acceptor and smart card reader of claim 41, wherein said bill acceptor data interface and said host interface each comprise a universal asynchronous receiver/transceiver (UART).

43. The combined bill acceptor and smart card reader of claim 35, wherein said host interface is connected to an electronic gaming machine.

44. The combined bill acceptor and smart card reader of claim 35, wherein said smart card reader comprises a secured internal meter contained with a security and authentication module (SAM).

45. The combined bill acceptor and smart card reader of claim 35, further comprising a system interface by which said cashless transaction data may be communicated to a central computer controlling or monitoring a plurality of host devices.

* * * * *